US011932183B2

United States Patent
Yang et al.

(10) Patent No.: US 11,932,183 B2
(45) Date of Patent: Mar. 19, 2024

(54) CENTRAL ELECTRONIC CONTROL UNIT FOR A VEHICLE

(71) Applicant: Magna Seating Inc., Aurora (CA)

(72) Inventors: Hanlong Yang, Novi, MI (US); Adiel De Jesus Astudillo Soto, Lake Orion, MI (US); Carlos Alberto Onofre Rosas, Sterling Heights, MI (US)

(73) Assignee: Magna Seating Inc., Aurora (CA)

( * ) Notice: Subject to any disclaimer, the term of this patent is extended or adjusted under 35 U.S.C. 154(b) by 360 days.

(21) Appl. No.: 17/432,181

(22) PCT Filed: Feb. 19, 2020

(86) PCT No.: PCT/US2020/018792
§ 371 (c)(1),
(2) Date: Aug. 19, 2021

(87) PCT Pub. No.: WO2020/172249
PCT Pub. Date: Aug. 27, 2020

(65) Prior Publication Data
US 2023/0135176 A1 May 4, 2023

Related U.S. Application Data

(60) Provisional application No. 62/807,312, filed on Feb. 19, 2019.

(51) Int. Cl.
*B60R 16/023* (2006.01)
*B60N 2/02* (2006.01)
(Continued)

(52) U.S. Cl.
CPC ...... *B60R 16/0231* (2013.01); *B60N 2/02246* (2023.08); *B60N 2/56* (2013.01);
(Continued)

(58) Field of Classification Search
CPC ... B60R 16/0231; B60R 16/03; B60R 16/037; B60N 2/02246; B60N 2/56; B60N 2/90;
(Continued)

(56) References Cited

U.S. PATENT DOCUMENTS 5,179,328 A * 1/1993 Furuse ................. B60N 2/0248
379/12
5,350,983 A * 9/1994 Miller ................. B60G 17/002
318/400.08
(Continued)

FOREIGN PATENT DOCUMENTS

DE 102007018419 10/2008
EP 0230203 7/1987

*Primary Examiner* — Mussa A Shaawat
(74) *Attorney, Agent, or Firm* — Miller Canfield

(57) ABSTRACT

A central electronic control unit (ECU, Ref. 14) is provided for controlling at least one bi-directional direct current (DC) motor (106) attached to a first vehicle seat and at least one electronic device attached to a second vehicle seat. The central ECU includes a micro-controller configured to receive feedback on a positional status of the bi-directional DC motor from a Hall Effect sensor (130). The micro-controller is configured to receive input instructions for the bi-directional DC motor and the electronic device. The micro-controller creates command instructions based in part on the received feedback and received input instructions. The central ECU selectively provides pulse width modulated (PWM) power to the bi-directional DC motor attached to the first vehicle seat and selectively provides power to the electronic device attached to the second vehicle seat in response to the command instructions from the micro-controller.

22 Claims, 25 Drawing Sheets

(51) Int. Cl.
*B60N 2/12* (2006.01)
*B60N 2/16* (2006.01)
*B60N 2/20* (2006.01)
*B60N 2/56* (2006.01)
*B60N 2/90* (2018.01)
*B60R 16/03* (2006.01)
*G06F 11/07* (2006.01)
*H02P 5/68* (2006.01)
*H02P 7/29* (2016.01)

(52) U.S. Cl.
CPC ............. *B60N 2/90* (2018.02); *B60R 16/03* (2013.01); *G06F 11/073* (2013.01); *G06F 11/079* (2013.01); *H02P 5/68* (2013.01); *H02P 7/29* (2013.01); *B60N 2/12* (2013.01); *B60N 2/16* (2013.01); *B60N 2/20* (2013.01)

(58) Field of Classification Search
CPC ... B60N 2/12; B60N 2/16; B60N 2/20; B60N 2/002; B60N 2/0248; B60N 2/0264; B60N 2002/924; B60N 2/5685; G06F 11/073; G06F 11/079; H02P 5/68; H02P 7/29
See application file for complete search history.

(56) References Cited

U.S. PATENT DOCUMENTS

| | | | | |
|---|---|---|---|---|
| 5,751,129 | A * | 5/1998 | Vergin | B60N 2/02246 318/625 |
| 5,965,993 | A * | 10/1999 | Bak | B60N 2/02246 318/266 |
| 5,966,291 | A * | 10/1999 | Baumel | H05K 7/20927 165/80.4 |
| 6,198,244 | B1 | 3/2001 | Hayden et al. | |
| 6,538,405 | B1 * | 3/2003 | Brzozowski | B60N 2/02246 303/20 |
| 6,590,354 | B2 | 7/2003 | Hein | |
| 6,962,392 | B2 * | 11/2005 | O'Connor | B60N 2/888 297/408 |
| 7,719,811 | B2 | 5/2010 | Brombach et al. | |
| 7,746,011 | B2 | 6/2010 | Gerding et al. | |
| 9,145,078 | B2 * | 9/2015 | Locke | B60N 2/22 |
| 9,688,162 | B2 | 6/2017 | Harden | |
| 10,843,606 | B2 * | 11/2020 | Vetere, II | B60N 2/203 |
| 2005/0253433 | A1 * | 11/2005 | Brown | B60N 2/233 297/283.3 |
| 2005/0253443 | A1 * | 11/2005 | Warren | A47C 4/54 297/452.4 |
| 2007/0126270 | A1 * | 6/2007 | Saint-Jalmes | B64D 11/06 297/283.3 |
| 2017/0371349 | A1 * | 12/2017 | Kim | G05D 1/0274 |
| 2018/0148007 | A1 | 5/2018 | Gage et al. | |
| 2019/0283640 | A1 * | 9/2019 | Vetere, II | B60N 2/753 |
| 2020/0223326 | A1 * | 7/2020 | Tanaka | B60N 2/853 |

* cited by examiner

CENTRAL ELECTRONIC CONTROL UNIT FOR A VEHICLE

CROSS-REFERENCE TO RELATED APPLICATIONS

This application claims priority to U.S. Provisional Application No. 62/807,312, filed on Feb. 19, 2019.

BACKGROUND OI THE INVENTION

1. Field of the Invention

The present invention relates to an electronic control unit for an automotive vehicle having a plurality of vehicle seats. More particularly, the invention relates to a central electronic control unit configured to operate a plurality of electronic devices within the vehicle seats and within the vehicle.

2. Description of Related Art

Automotive vehicles include one or more automotive seat assemblies having a seat cushion and a seat back for supporting a passenger or occupant above a vehicle floor. Each seat assembly is commonly mounted to the vehicle floor by a riser assembly. The seat back is typically operatively coupled to the seat cushion by a recliner assembly for providing selective pivotal adjustment of the seat back relative to the seat cushion. The automotive seat assemblies may include one or more bi-directional direct current (DC) motors for repositioning the seat cushion and/or the seat back. The seat assemblies may further include other electronic devices such seat heating systems, venting systems, electrical switches, actuators, solenoids, and/or power latches. Further, a plurality of sensors may be integrated within each vehicle seat to provide feedback about the conditions of the electronic devices and/or conditions of each vehicle seat.

Automotive vehicles often include additional electronic devices operatively coupled to vehicle component systems, such as an adjustable vehicle steering wheel, adjustable accelerator and brake pedals, adjustable driver side and passenger side mirrors, and vehicle doors. These electronic devices typically include bi-directional direct current (DC) motors, actuators, solenoids, mirror defrosters, power mirrors, illumination devices, illuminated indicators, power latches, electrical switches, and sensors, as non-limiting examples.

It is commonly known for a vehicle seat assembly to include a power seat module that operates bi-directional DC motors within the vehicle seat. Further, it is commonly known for the power seat module to operate additional electronic devices within the vehicle seat such as a seat heating system or a seat venting system. For example, U.S. Pat. No. 6,590,354 discloses a vehicle seat motor assembly module comprising a power seat module integrated with a plurality of seat motors. The power seat module includes a micro-controller that receives feedback from seat temperature sensors and position sensors, receives command instructions through a local interconnect network (LIN) from a switch, and distributes power to a seat heating system, a seat bottom venting system, and a plurality of seat motors. The micro-controller triggers a relay to provide power to one of the bi-directional DC motors in response to feedback received from the switch. However, the power seat module appears to lack the capability to provide pulse width modulation (PWM) control of the seat motors. Further, the power seat module only provides power to electronic devices within the vehicle seat. As such, the power seat module lacks features allowing the power seat module to provide power to electronic devices within other vehicle component systems such as the steering column, acceleration and brake pedals, outer mirrors, and doors. Further, the power seat module lacks the capability of controlling electronic devices attached to other vehicle seats within the vehicle. Finally, since each vehicle seat includes a power seat module, a plurality of power seat modules are incorporated within each vehicle. Thus, the vehicle control architecture is complicated since the power seat modules must be incorporated within the vehicle wide communication network. Since each power seat module solely controls the electronic devices within the attached vehicle seat, there is no means of prioritizing actuation of electronic devices between the vehicle seats and vehicle component systems.

It is also commonly known for certain vehicles to include a central controller connected by a communication network to various electronic devices within the vehicle. For example, German Publication No. DE102007018419 discloses a central controller connected by a controller area network (CAN) bus to a diagnostic unit. The central controller is connected over a local interconnect network (LIN) to electronic devices within a driver seat, a passenger seat, a rear seat, a steering column, and outer mirrors. The central controller includes a position memory, an operating system, and a unit for retaining individual data. The central controller provides requests for changes of positions and provides other parameters to electronic devices attached to the driver seat, passenger seat, rear seat, steering column, and outer mirrors. Each vehicle seat includes a drive, such as a power seat module, for repositioning the vehicle seat in response to requests and parameters received from the central controller. While the central controller provides requests and parameters to various electronic devices, the central controller lacks an apparent capability to provide pulse width modulation (PWM) control of bi-directional direct current (DC) motors. Further, while the central controller provides requests and parameters to electronic devices within vehicle seats, steering column, and outer mirrors, the central controller does not appear to provide requests and parameters to other electronic devices that are part of vehicle doors or associated with an accelerator or brake pedal. In addition, the central controller lacks an apparent capability to provide PWM control of bi-directional DC motors associated with the steering column, outer mirrors, accelerator, and brake pedal. Thus, the central controller appears to rely on typical local control modules, such as the power seat module, to locally control electrical devices since the central controller provides requests and parameters to a plurality of distributed drive systems.

Current systems rely on a power seat module associated with a single vehicle seat to operate electronic devices within the vehicle seat. When a vehicle includes a driver seat, a passenger seat, and optionally, rear seats, with each vehicle seat having one or more bi-directional DC motors, each vehicle seat typically includes a power seat module for controlling the bi-directional DC motors within the vehicle seat. While the power seat modules may communicate through a vehicle-wide communication network (LIN/CAN) to remote switches and to a central controller, each power seat module provides power to bi-directional DC motors within the attached vehicle seat. Further, the central controller lacks the capability to provide PWM control of bi-directional DC motors attached to vehicle seats and merely transmits requests and parameters to the power seat modules attached to the vehicle seats.

It is desirable, therefore, to provide a central electronic control unit configured to provide pulse width modulation (PWM) control of bi-directional direct current (DC) motors within the vehicle seats and/or associated with other vehicle components such as an adjustable steering wheel, adjustable accelerator and brake pedals, and adjustable mirrors. It is also desirable to provide a central electronic control unit configured to provide power to one or more seat heating systems, seat venting systems, actuators, solenoids, illumination devices, and latches. Further, it is desirable to provide a central electronic control unit configured to prioritize actuation of the connected electronic devices. Finally, it is desirable to provide a central electronic control unit with a flexible architecture such that the central electronic control unit is reprogrammable to support a variety of end applications.

SUMMARY OF THE INVENTION

A central electronic control unit (ECU) is provided for controlling at least one bi-directional direct current (DC) motor attached to a first vehicle seat and at least one electronic device attached to a second vehicle seat. The central ECU includes a micro-controller configured to receive feedback on a positional status of the bi-directional DC motor from a Hall Effect sensor. The micro-controller is configured to receive input instructions for the bi-directional DC motor and the electronic device. The micro-controller creates command instructions based in part on the received feedback and received input instructions. The central ECU selectively provides pulse width modulated (PWM) power to the bi-directional DC motor attached to the first vehicle seat and selectively provides power to the electronic device attached to the second vehicle seat in response to the command instructions from the micro-controller.

BRIEF DESCRIPTION OF TILE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, like numerals indicate like or corresponding parts throughout the several views.

Figure 1:
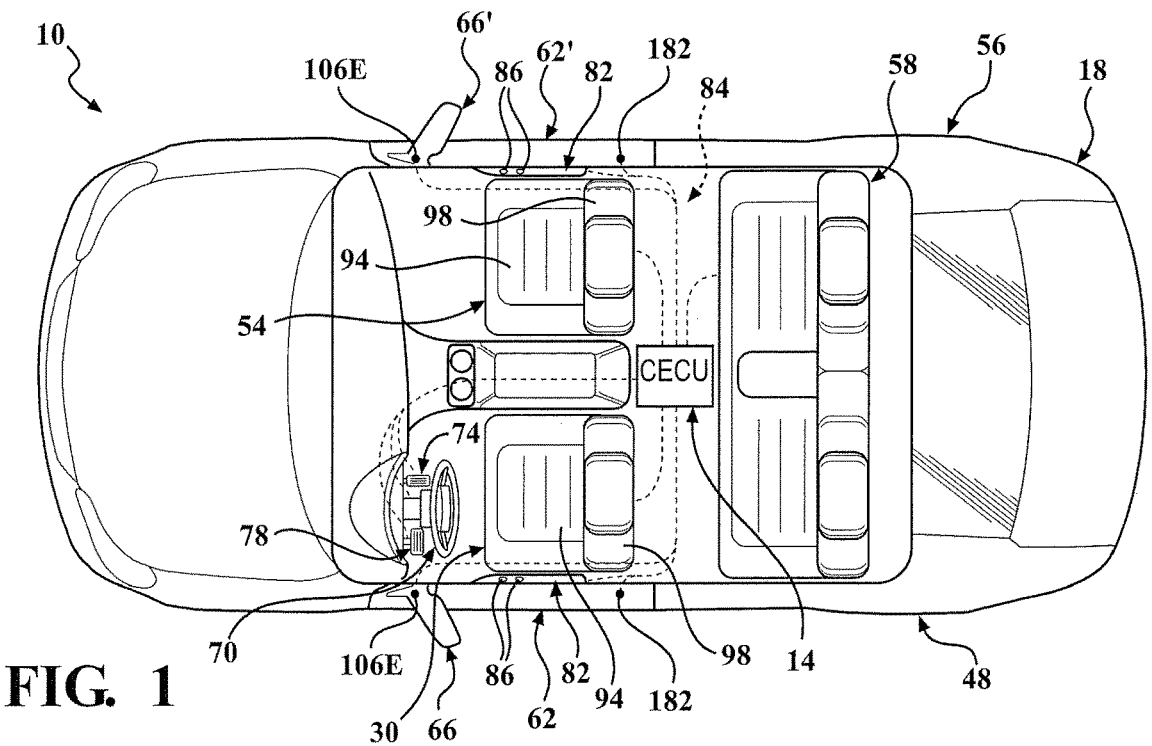
FIG. 1 is a block diagram of an electrical/electronic system architecture having a central electronic control unit (ECU) for a vehicle, according to one embodiment of the present invention.
Figure 2:
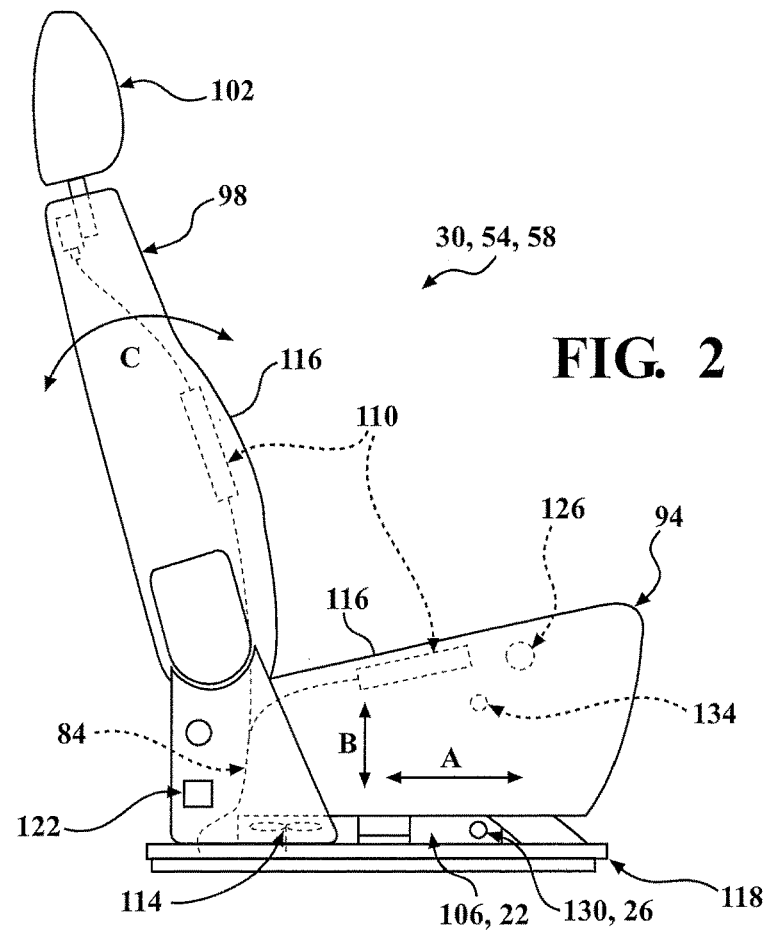
FIG. 2 is a side view of a vehicle seat, according to one embodiment of the present invention.
Figure 3A:
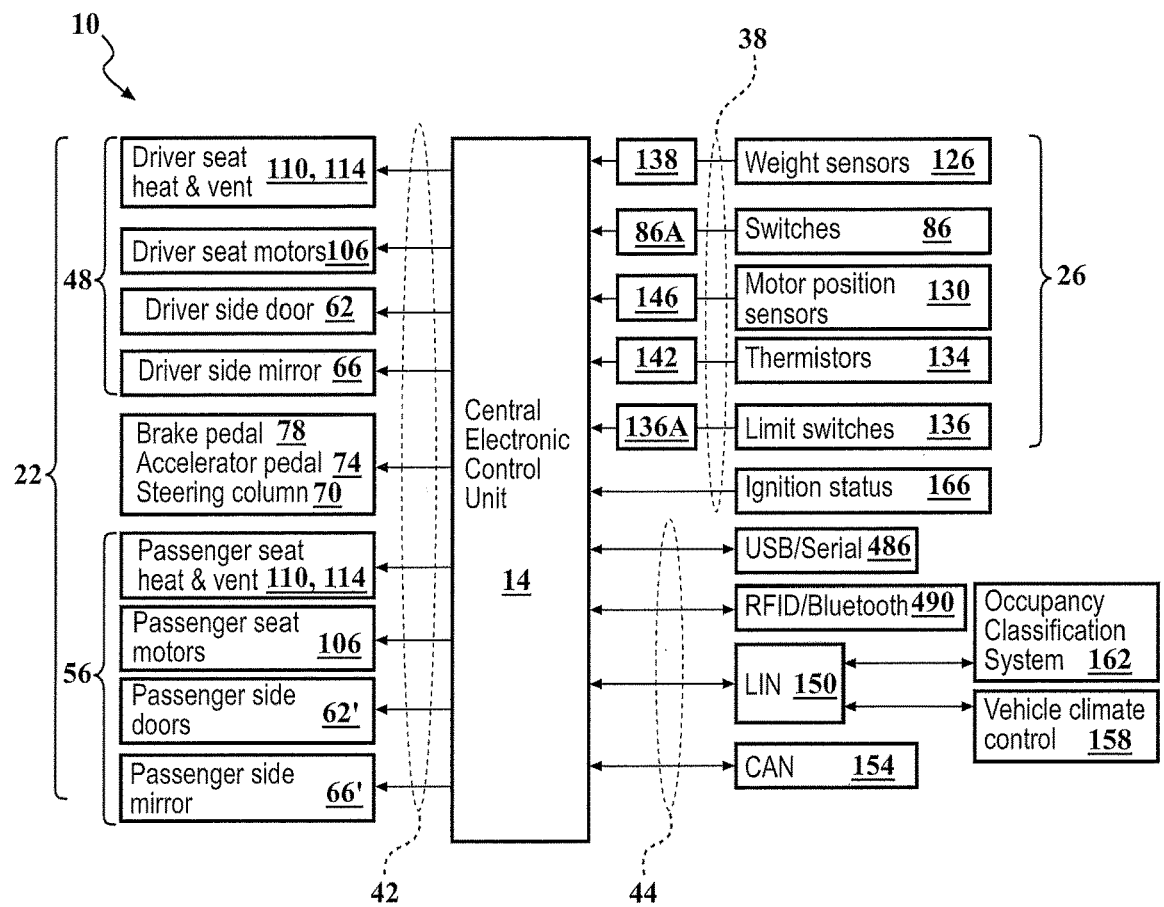
FIGS. 3A and 3B are block diagrams of electrical inputs and electrical outputs of the central ECU, according to one embodiment of the present invention.
Figure 3B:
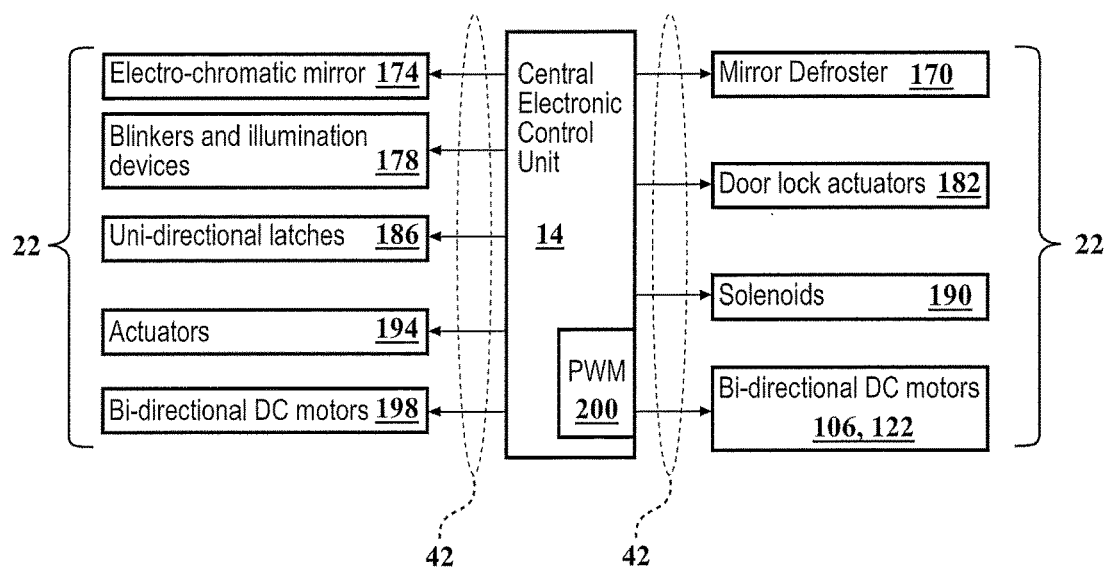
Figure 4A:
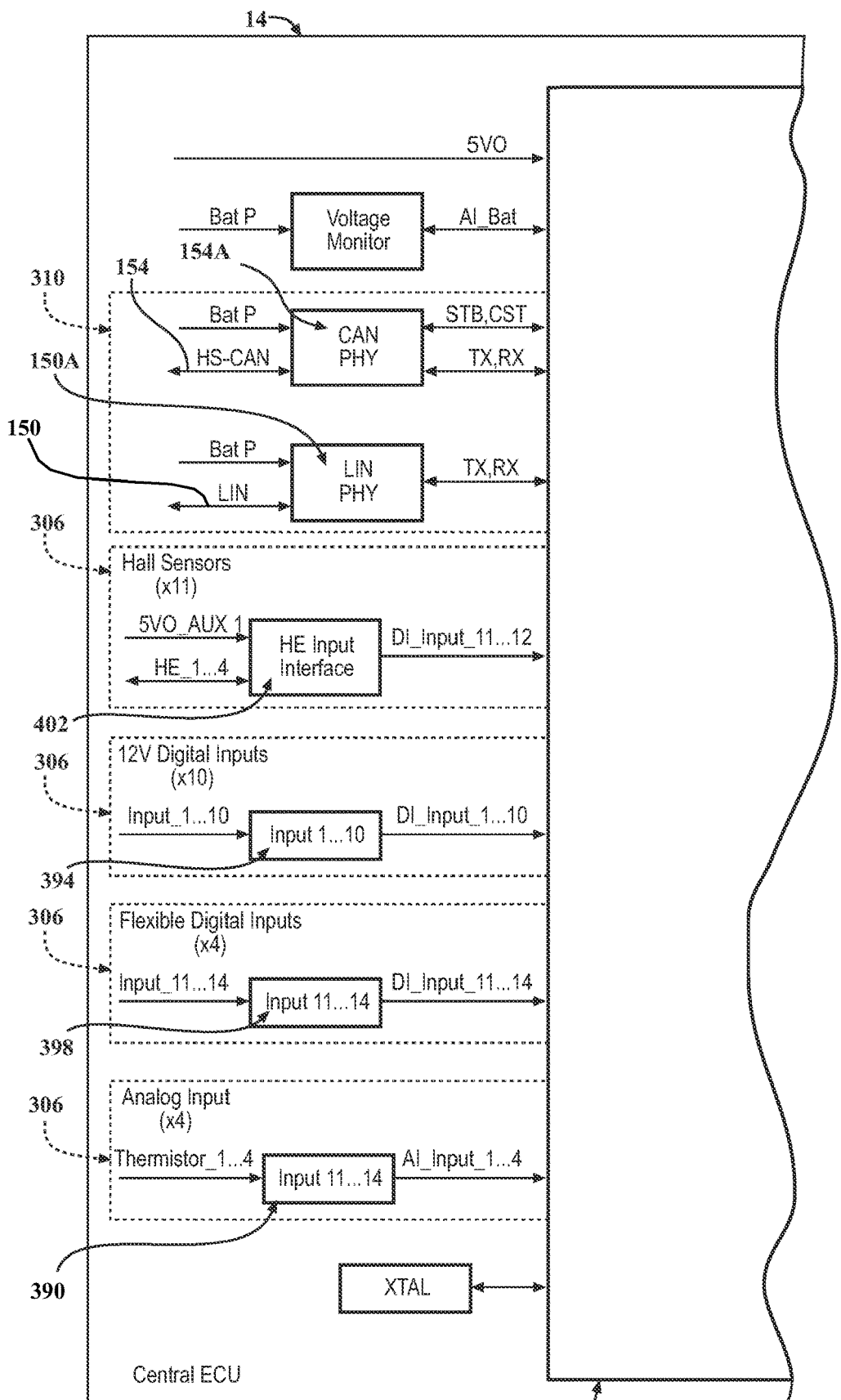
FIGS. 4A and 4B are a high level block diagram of the central ECU, according to one embodiment of the present invention.
Figure 4B:
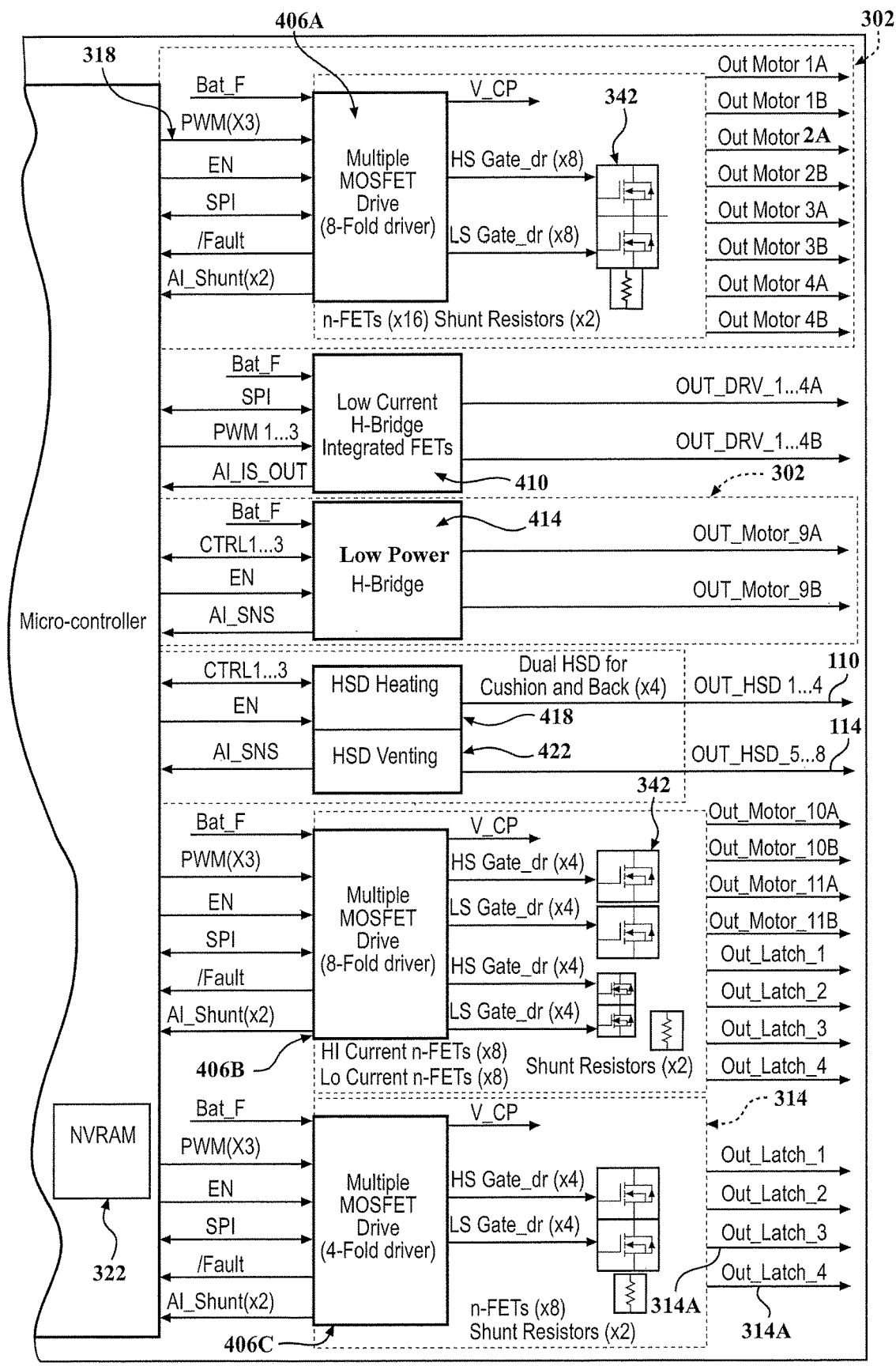

Referring to FIGS. 1 through 4B, one embodiment of electrical/electronic system architecture 10 is shown in the environment for which the present invention is to be operating. As shown in FIG. 1, the electrical/electronic system architecture 10 includes a central electronic control unit (ECU) 14 incorporated into a vehicle 18, such as an automotive vehicle 18. FIG. 2 illustrates electronic devices 22 and electronic sensors 26 attached to a vehicle seat 30, such as a driver seat 30. Block diagrams of the electrical/electronic system architecture 10 are shown in FIGS. 3A and 3B illustrating electrical inputs 38, electrical outputs 42, and receive/transmit communications 44 of the central ECU 14. A block diagram of the central ECU 14 is shown in FIGS. 4A and 4B.

As shown in FIG. 1, the vehicle 18 includes the central ECU 14 electrically connected to the driver seat 30 on a driver side 48 of the vehicle 18, a passenger seat 54 on a passenger side 56 of the vehicle 18, a rear seat 58, driver side 48 and passenger side 56 door assemblies 62, 62', driver side 48 and passenger side 56 outer mirrors 66, 66', a steering column 70, an accelerator pedal 74, a brake pedal 78, and one or more switch modules 82 by a wiring harness 84. Each switch module 82 includes one or more electrical input switches 86 for providing input instructions 86A to the central ECU 14.

Referring to FIG. 2, each of the driver, passenger, and rear vehicle seats 30, 54, 58 includes a seat cushion 94, a seat back 98 rotationally coupled to the seat cushion 94, and a head restraint 102 attached to the seat back 98. As shown in FIG. 1, the driver seat 30, passenger seat 54, and the rear seat 58 are spaced apart from each other. The vehicle 18 includes a plurality of electronic devices 22, with each electronic device 22 being designed to perform a specific function. Examples of electronic devices 22 attached to the vehicle seats 30, 54, 58 are shown in FIG. 2. The electronic devices 22 include bi-directional direct current (DC) motors 106, heating systems 110, and venting systems 114. The heating systems 110 include seat heating elements 110 to heat seat surfaces 116 of the seat cushion 94 and seat back 98. Likewise, the venting system 114 ventilates and/or cools the seat surfaces 116 of the vehicle seats 30, 54, 58. The heating systems 110 and venting systems 114 are examples of seat surface temperature control systems. Each vehicle seat 30, 54, 58 optionally includes one or more bi-directional current (DC) motors 106 configured to reposition the seat cushion 94 fore/aft (arrow A) along a track 118, adjust seat cushion 94 height (arrow B), adjust the seat cushion 94 tilt, and/or adjust the head restraint 102. Certain vehicle seats 30, 54, 58 include an additional recline bi-directional DC motor 122 to adjust the inclination (arrow C) of the seat back 98 relative to the seat cushion 94.

As shown in FIGS. 2 and 3A, the vehicle seats 30, 54, 58 include a plurality of electronic sensors 26, with each electronic sensor 26 being designed to provide feedback to the central ECU 14 on a status of an associated electronic device 22, an associated seat cushion 94, and/or an associated seat back 98. Weight sensors 126, motor position sensors 130, thermistors 134, and limit switches 136 are examples of electronic sensors 26 included within vehicle seats 30, 54, 58. The weight sensors 126 provide feedback 138 about an occupancy status of the vehicle seats 30, 54, 58. The thermistors 134 provide feedback 142 about a thermal status of the associated heating system 110. The limit switches 136 provide feedback 136A to the central ECU 14. Motor position sensors 130 provide feedback 146 about a positional status of an associated bi-directional DC motor 106. An example of one type of a motor position sensor 130 is a Hall Effect sensor 130.

Information and instructions are received and/or transmitted by the central ECU 14 through communication network interfaces 150, 154, such as a local interconnect network (LIN) interface 150 and a controlled area network (CAN) interface 154, as shown in FIG. 3A. The central ECU 14 receives instructions and information relayed through the LIN interface 150 and/or CAN interface 154 from other control modules 158, 162 within the vehicle 18, and receives status indicators such as an ignition switch 166 being energized or de-energized. In addition, the central ECU 14 transmits instructions and information through the communication network interfaces 150, 154 to other control modules 158, 162, such as a vehicle climate control module 158 and an occupancy classification system control module 162. Further, the central ECU 14 is configured to receive feedback and input instructions from the plurality of electronic sensors 26 and input switches 86 within the vehicle 18.

Also shown in FIG. 3A, the central ECU 14 selectively provides power output 42 to driver side 48 electronic devices 22, including driver seat 30 heating systems 110, venting systems 114, and bi-directional DC motors 106. The central ECU 14 also selectively provides power output 42 to electronic devices 22 associated with the driver side 48 outer mirror 66 and the driver side 48 door assembly 62. In addition, the central ECU 14 selectively provides power output 42 to electronic devices 22 associated with the passenger side 56 of the vehicle 18, including the passenger side 56 outer mirror 66', the passenger side 56 door 62', and the passenger seat 54 heating systems 110, venting systems 114, and bi-directional DC motors 106. Further, the central ECU 14 selectively provides power output 42 to electronic devices 22 associated with the brake pedal 78, the accelerator pedal 74, and the steering column 70.

As shown in FIG. 3B, the central ECU 14 selectively provides power output 42 to mirror defrosters 170, electrochromatic mirrors 174, blinkers and illumination devices 178, door lock actuators 182, uni-directional latches 186, solenoids 190, actuators 194, and other bi-directional DC motors 198. Further, the central ECU 14 provides pulse width modulated (PWM) power 200 to selected bi-directional DC motors 106, 122.

The central ECU 14, shown in FIGS. 4A and 4B, integrates functions of a plurality of distributed electronic control units (ECU) 202, 206 into a single centralized system. One example of a distributed ECU 202, 206 is a generally known power seat module 202 illustrated in FIG. 5. The known power seat module 202 is configured to selectively provide power output to electronic devices 22 associated with a single vehicle seat 30, 54, 58, such as bi-directional DC motors 106L-106N, 122M, heating systems 110-1, 110-2, and venting systems 114-1, 114-2. A vehicle 18 is typically configured with a separate power seat module 202 for each vehicle seat 30, 54, 58.

Figure 5:
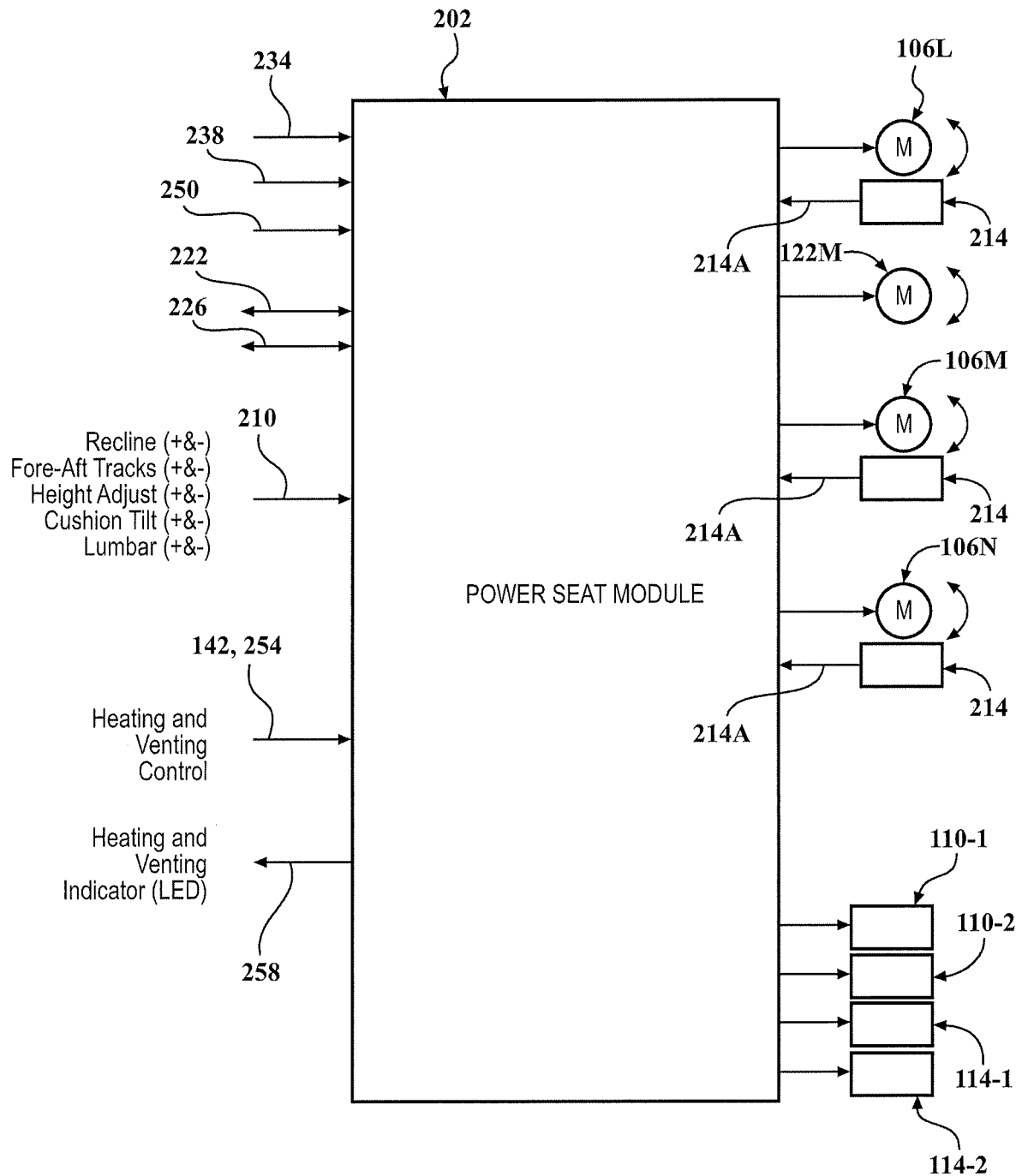
FIG. 5 is a block diagram of a known power seat module.

As illustrated in FIG. 5, the known power seat module 202 selectively provides power output to bi-directional DC motors 106L-106N, 122M, heating systems 110-1, 110-2 attached to the seat cushion 94 and the seat back 98, respectively, and venting systems 114-1, 114-2 attached to the seat cushion 94 and the seat back 98, respectively, based in part on received digital inputs 210, feedback 214A from Hall Effect sensors 214, feedback 142 from thermistors 134, and command instructions received through a controlled area network (CAN) interface 222 and/or through a local interconnect network (LIN) interface 226. The known power seat module 202 selectively provides power output to bi-directional DC motors 106L-106N, 122M with typical vehicle 18 seat functions such as mid-power control 106L, low-power control 106M, lumbar control 106N, and seat back recline 122M. The operatively connected bi-directional DC motors 106L-106N, 122M include a range of current draw requirements. For example, the lumbar bi-directional DC motor 106N typically draws about 3 amps with a peak current draw of about 7 amps. In contrast, the seat back recline bi-directional DC motor 122M can typically draw up to about 42 amps. Mid-power control bi-directional DC motors 106L are typically associated with fore-aft track 118 movement, height adjustment, and cushion tilt. The mid-power control bi-directional DC motors 106L typically draw between about 5 amps and 7 amps with peak current draw between about 13 amps and 18 amps. Typical low-power control bi-directional DC motors 106M provide telescopic and tilt functions of a head restraint 102. Certain bi-directional DC motors 106L-106N include a Hall Effect sensor 214 providing feedback 214A to the known power seat module 202 relating to movement and/or position of the bi-directional DC motors 106L-106N. However, in other bi-directional DC motors, such as seat back recline motor 122M, the Hall Effect sensor 214 is omitted since the known power seat module 202 does not require feedback for the seat back recline motor 122M function.

Also shown in FIG. 5, the known power seat module 202 receives digital inputs 210 providing movement instructions for forward (+) and rearward (−) directional movement of recline, fore-aft tracks, height adjustment, cushion tilt, and lumbar bi-directional DC motors 106L-106N, 122M. Battery power 234 and ground 238 are supplied to the power seat module 202. Communication external of the power seat module 202 is provided through the CAN interface 222 and/or LIN interface 226. An ignition input 250 informs the power seat module 202 if the ignition 250 is energized or de-energized. The power seat module 202 selectively provides power output to the individual bi-directional DC motors 106L-106N, 122M based in part on preprogrammed instructions stored in the power seat module 202, feedback 214A received from the Hall Effect sensors 214, received digital inputs 210 for each of the bi-directional DC motors 106L-106N, 122M, and/or command instructions received by way of the CAN interface 222 and/or LIN interface 226.

The known power seat module 202 shown in FIG. 5 selectively provides power output to heating systems 110-1, 110-2 and venting systems 114-1, 114-2 typically integrated within the seat cushion 94 and the seat back 98 of the associated vehicle seats 30, 54, 58. The heating systems 110-1, 110-2 and venting systems 114-1, 114-2 include thermistors 134 that provide feedback 142 to the power seat module 202. Thermistor 134 feedback 142 and command instructions 254 for the heating and venting systems 110-1, 110-2, 114-1, 114-2 are received as inputs to the power seat module 202. The power seat module 202 provides power output to individual heating and venting systems 110-1, 110-2, 114-1, 114-2 based in part on received command instructions 254 and thermistor 134 feedback 142. Heating and venting illumination indicator outputs 258 are selectively powered by the power seat module 202 to indicate a status of the heating and venting systems 110-1, 110-2, 114-1, 114-2.

Figure 6:
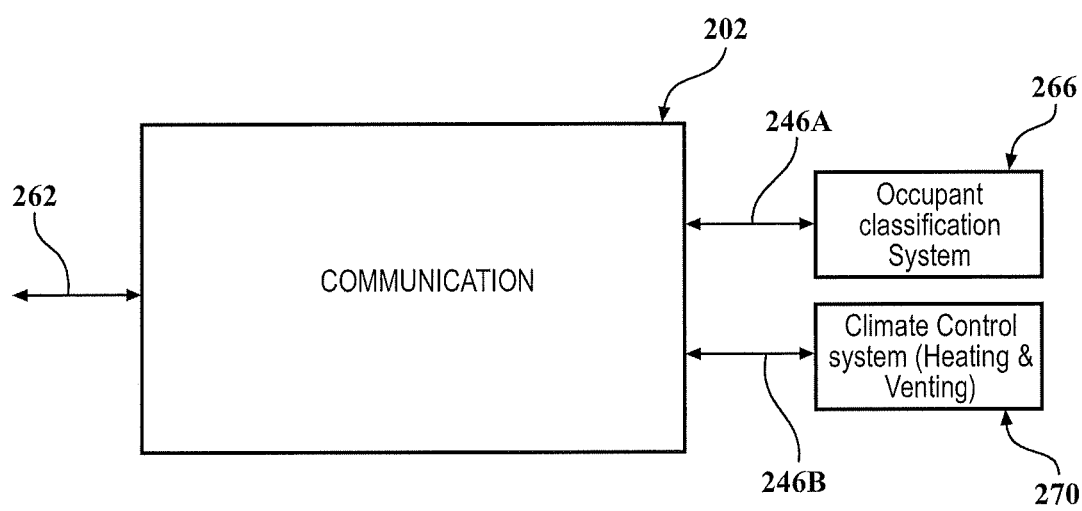
FIG. 6 is a block diagram of a known seat communication module.

Referring to FIG. 6, the known power seat module 202 includes additional communication interfaces 262, such as a vehicle CAN flexible data rate (CAN-FD) interface 262. A LIN (slave 1) interface 246A provides two-way communication with a distributed occupant classification system (OCS) control module 266. The OCS control module 266 receives sensor input from a vehicle seat 30, 54, 58 and determines an estimated weight classification for an occupant in the vehicle seat 30, 54, 58. Further, a LIN (slave 2) interface 246B provides two-way communication with a distributed climate control system (heating and venting) control module 270.

Vehicles 18 are typically configured with a separate power seat module 202 for each vehicle seat 30, 54, 58 requiring control of bi-directional DC motors 106L-106N, 122M, heating systems 110-1, 110-2, and/or venting systems 114-1, 114-2.

Figure 7:
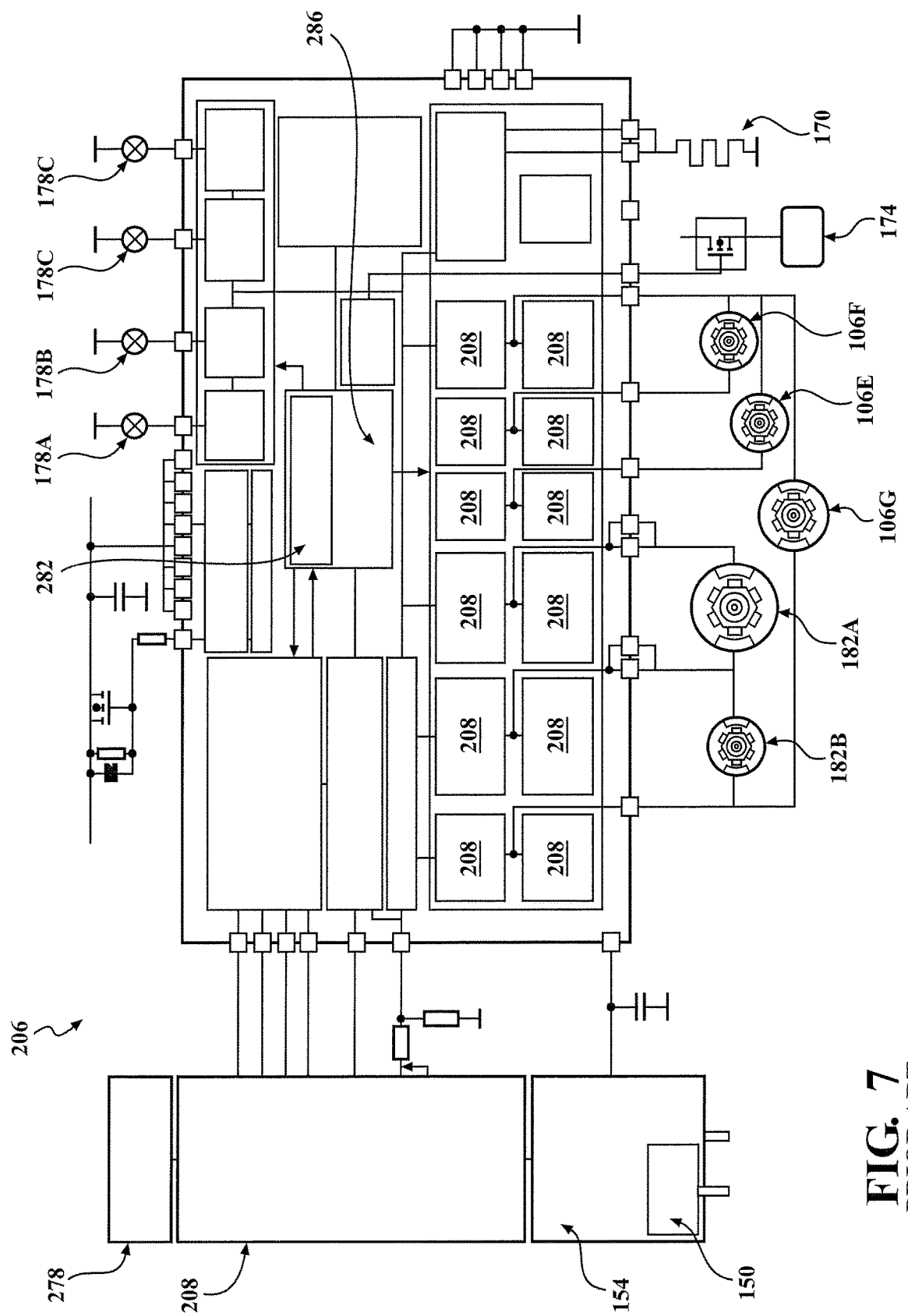
FIG. 7 is a schematic diagram of a known power door control module.

A second example of a distributed electronic control unit 202, 206 is a generally known door module 206, illustrated in FIG. 7. An example of a known door module 206 is door module driver-IC part number NCV7707 manufactured by ON Semiconductor®. This known door module 206 includes electromechanical relays 208 providing power output to bi-directional DC motors 106E-106G, a mirror defroster 170, and electro-chromatic mirror 174 for a single outer mirror 66, 66'. The bi-directional DC motors 106E-106G attached to the outer mirror 66, 66' include a mirror x-axis motor 106E, a mirror y-axis motor 106F, and a mirror folding motor 106G. Additional controlled outputs selectively provide power to illumination devices 178A-178C, such as an integrated blinker 178A, footstep light 178B, and safety lights 178C. Further, as indicated in FIG. 7, this known door module 206 selectively provides power output to a door lock actuator 182A and a safety lock actuator 182B for a single vehicle door 62, 62'. A LIN interface 150, a CAN interface 154, and a switch interface 278 transfer command instructions to the door module 206. Internally, the door module 206 includes a pulse width modulation (PWM) generation unit 282 and a logic controller 286. Thus, the door module 206 is capable of providing PWM power output to the mirror motors 106E-106G. A typical vehicle 18 includes a plurality of door modules 206, with each door module 206 configured to control electronic devices 22 within a single door assembly 62, 62' and associated outer mirror 66, 66'.

The central ECU 14, shown in FIGS. 4A and 4B, integrates functions of the plurality of power seat modules 202 and, optionally, the plurality of door modules 206 into a single centralized system. Other electronic modules are optionally integrated within the central ECU 14 as desired for a specific application. The central ECU 14 is a centralized system consisting of multiple bi-directional DC motor control interfaces 302, input interfaces 306, communication network interfaces 310, and high side power output interfaces 314. The central ECU 14 has a flexible architecture for applications where bi-directional DC motor 106, 122 control is required, for functions such as: power seats 30, 54, 58, power outer mirrors 66, 66', adjustable pedals 74, 78, and adjustable steering column 70. The central ECU 14 controls the bi-directional DC motor 106, 122 adjustment speed and includes pulse width modulation (PWM) 318 motor control capabilities. Further, the central ECU 14 includes non-volatile random-access memory (NVRAM) 322, allowing the central ECU 14 to provide memory functions for the various bi-directional DC motors 106, 122. Single power outputs 314A are included in the central ECU 14 to provide power output to system applications, such as heated seats 110, vented seats 114, illumination devices 178, mirror defrosters 170, electro-chromatic mirrors 174, uni-directional latches 186, solenoids 190, and actuators 194.

In contrast to typical control modules 202, 206 having electromechanical relays 208, the central ECU 14 includes solid-state components 342. Utilizing solid-state components 342, including solid-state relays 342, increases the diagnostic capability of the central ECU 14 for the growing smart safety systems and autonomous vehicle 18 applications. The central ECU 14 simplifies actual vehicle electrical/electronic system architecture 10 by decreasing the amount of control modules 202, 206 in the vehicle 18. In addition, the central ECU 14 reduces the amount of engineering effort required to integrate the multiple control modules 202, 206 within the vehicle communication network interfaces 150, 154. Replacing the multiple distributed control modules 202, 206 with a single central ECU 14 reduces the complexity of the vehicle communication network interfaces 150, 154. The central ECU 14 provides a portable solution with the flexibility of interfacing with other electronic devices 22, even beyond power seating applications.

Additional capabilities can be included in the central ECU 14 since the central ECU 14 utilizes traditional embedded types of communication network interfaces 150, 154 as well as additional communication network interfaces 310 supporting USB, Bluetooth, serial bus, RFID, high speed controlled area network (HS-CAN), Wi-Fi, cellular, as non-limiting examples. Status indicators and command instructions are transmitted from the central ECU 14 through one or more communication networks 150, 154, 310 to other electronic modules within the vehicle 18, and optionally to electronic devices external of the vehicle 18.

As will be further described below, the central ECU 14 is configured to selectively provide power output to the associated electronic devices 22 based on predefined sequences, power draw limits, and/or prioritization of actuations.

Figure 8:
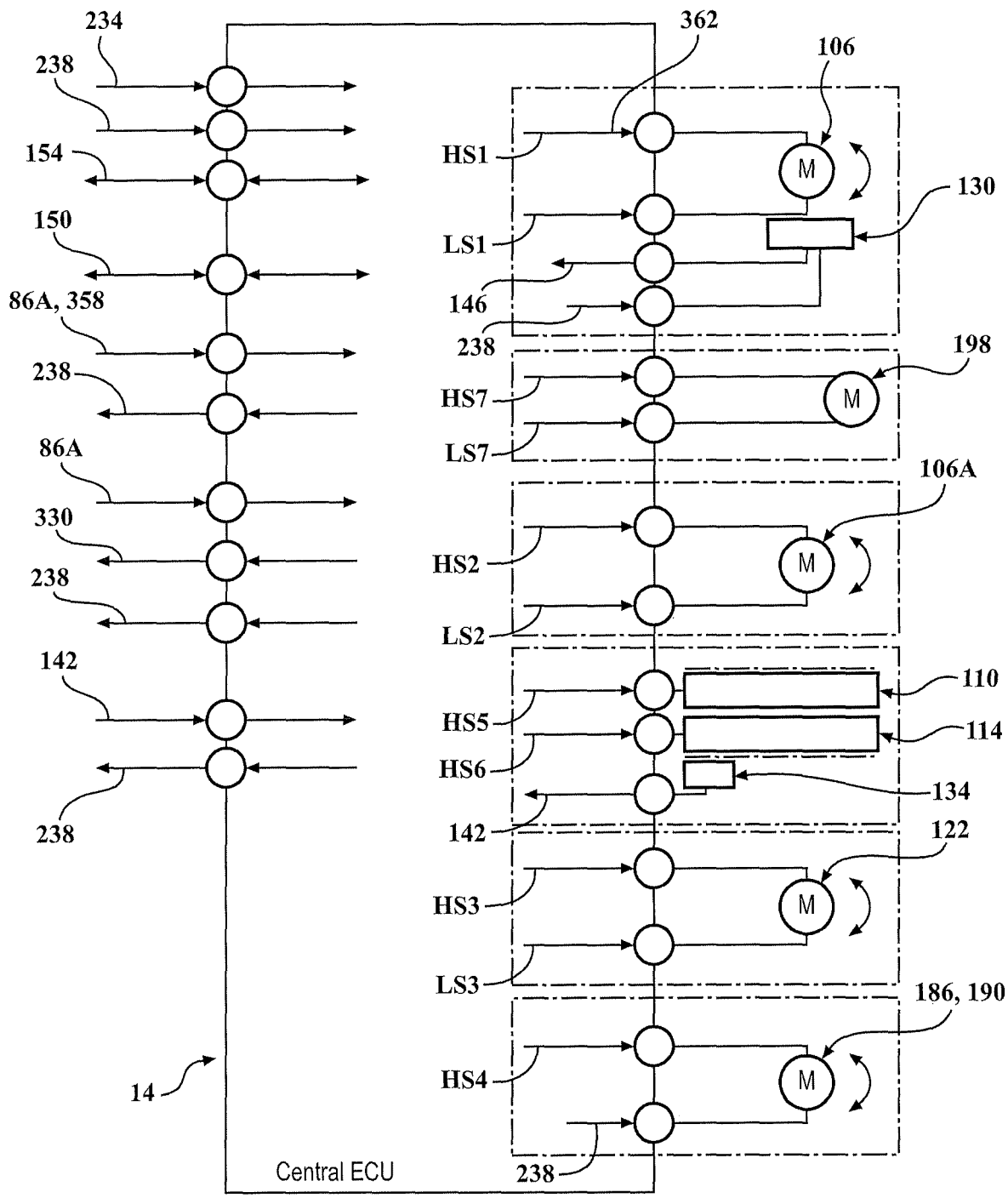
FIG. 8 is a block diagram showing electrical inputs and electrical outputs of the central ECU of FIGS. 4A and 4B, according to one embodiment of the present invention.
Figure 9:
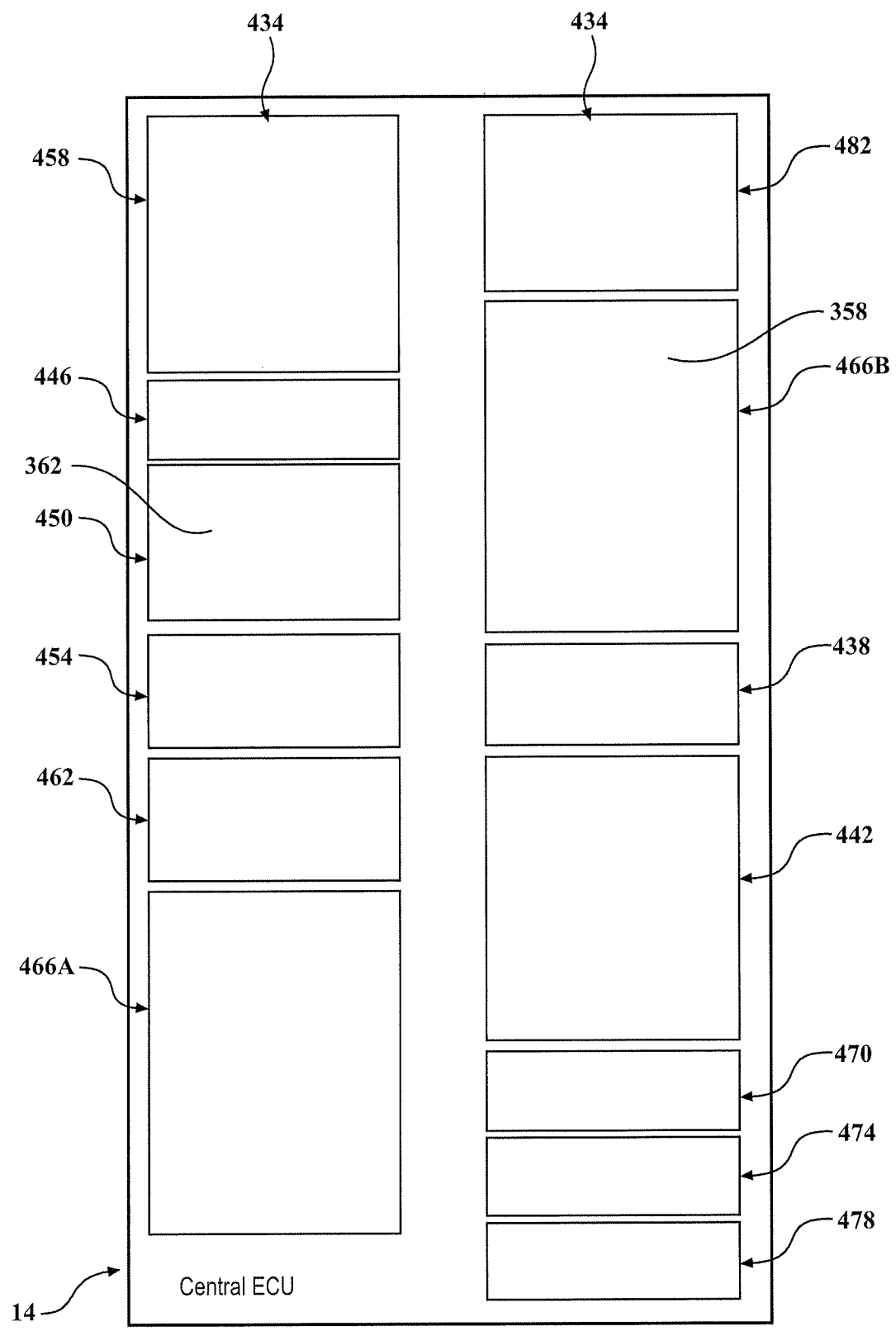
FIG. 9 is a block diagram showing electrical input and output connection blocks of the central ECU of FIGS. 4A and 4B, according to one embodiment of the present invention.

The central ECU 14 shown in FIGS. 4A and 4B is further illustrated in FIGS. 8-28. FIGS. 8 and 9 illustrate electrical inputs 358 and electrical outputs 362 of the central ECU 14. FIGS. 10-18 illustrate schematic diagrams of electrical connections between the central ECU 14, electronic devices 22, electronic sensors 26, and communication network interfaces 150, 154, 310. FIGS. 19-27 illustrate block diagrams of portions of the central ECU 14 shown in FIGS. 4A and 4B. FIG. 28 illustrates control architecture 374 of the central ECU 14.

Referring to FIGS. 4A and 4B, the central ECU 14 generally includes a micro-controller 386 operatively coupled to one or more communication network interfaces 150, 154, 310, an analog input interface 390, digital input interfaces 394, 398, 402, multiple metal oxide semiconductor field effect transistor (MOSFET) drivers 406A-406C, a low current H-bridge 410, a low power H-bridge 414, and dual high side driver relays 418, 422. The digital input interfaces 394, 398, 402 include a 12-volt digital input interface 394, a flexible digital input interface 398, and a Hall Effect position sensor input interface 402. Individual inputs 306 and outputs 302 of the central ECU 14 can be re-assigned to different electronic devices 22 and electronic sensors 26 within various vehicle 18 subsystems depending on specific requirements of an intended application. Further, the central ECU 14 can include more or less electrical inputs 306 and electrical outputs 302, 314 as desired for specific applications. Likewise, the central ECU 14 can include more or less interfaces 150, 154, 310, 390, 394, 398, 402, MOSFET drivers 406A-406C, H-bridges 410, 414, etc., and can include other electronic modules as desired for specific applications.

A block diagram showing electrical connections between the central ECU 14 and the electrical/electronic system architecture 10 is illustrated in FIG. 8. Electrical inputs 38 to the central ECU 14 include battery power 234, battery ground 238, switch input instructions 86A, thermistor feedback 142, and Hall Effect sensor feedback 146. Two way communication passes between the central ECU 14 and the LIN 150 and CAN 154 interfaces. High side power HS1 and low side power LS1 are provided to bi-directional DC motors 106 having associated Hall Effect sensors 130. Additional high side power HS2 and low side power LS2 are provided to other bi-directional DC motors 106A lacking Hall Effect sensors 130. High current high side power HS3 and low side power LS3 is provided to recline bi-directional DC motors 122 having high current draw. High side power HS4 and ground 238 are supplied to uni-directional latches/solenoids 186, 190. High side driver power HS5, HS6 is provided to heating systems 110 and venting systems 114, respectively. High side driver power HS7 and low side driver power LS7 are supplied to other motors 198. Other electrical outputs 42 from the central ECU 14 include 5-volt auxiliary power output 330 supplied to switches 86, with ground 238 being supplied to thermistors 134, switches 86, and Hall Effect sensors 130.

FIG. 9 illustrates the input and output connection blocks 434 of the central ECU 14. The central ECU 14 includes a plurality of connection blocks 434, including but not limited to: a power supply connection block 438, a DC motor power stage connection block 442, an actuator power stage connection block 446, a high current motor power stage connection block 450, a communication interface connection block 454, an external position sensor interface connection block 458, a general purpose digital output connection block 462, one or more external user interface connection blocks 466A, 466B, a high current high side driver power stage connection block 470, external temperature sensor interface connection block 474, a medium current high side driver power stage connection block 478, and/or a low current DC motor power stage connection block 482. The central ECU 14 can include other combinations of input and output connection blocks 434 as desired for specific applications. The number and type of electrical inputs and electrical outputs for each connection block 434 are selected based in part on a desired application of the central ECU 14. As such, various embodiments of the central ECU 14 may include more or less electrical input/output connections and may include different combinations and types of electrical inputs and electrical outputs.

Figure 10:
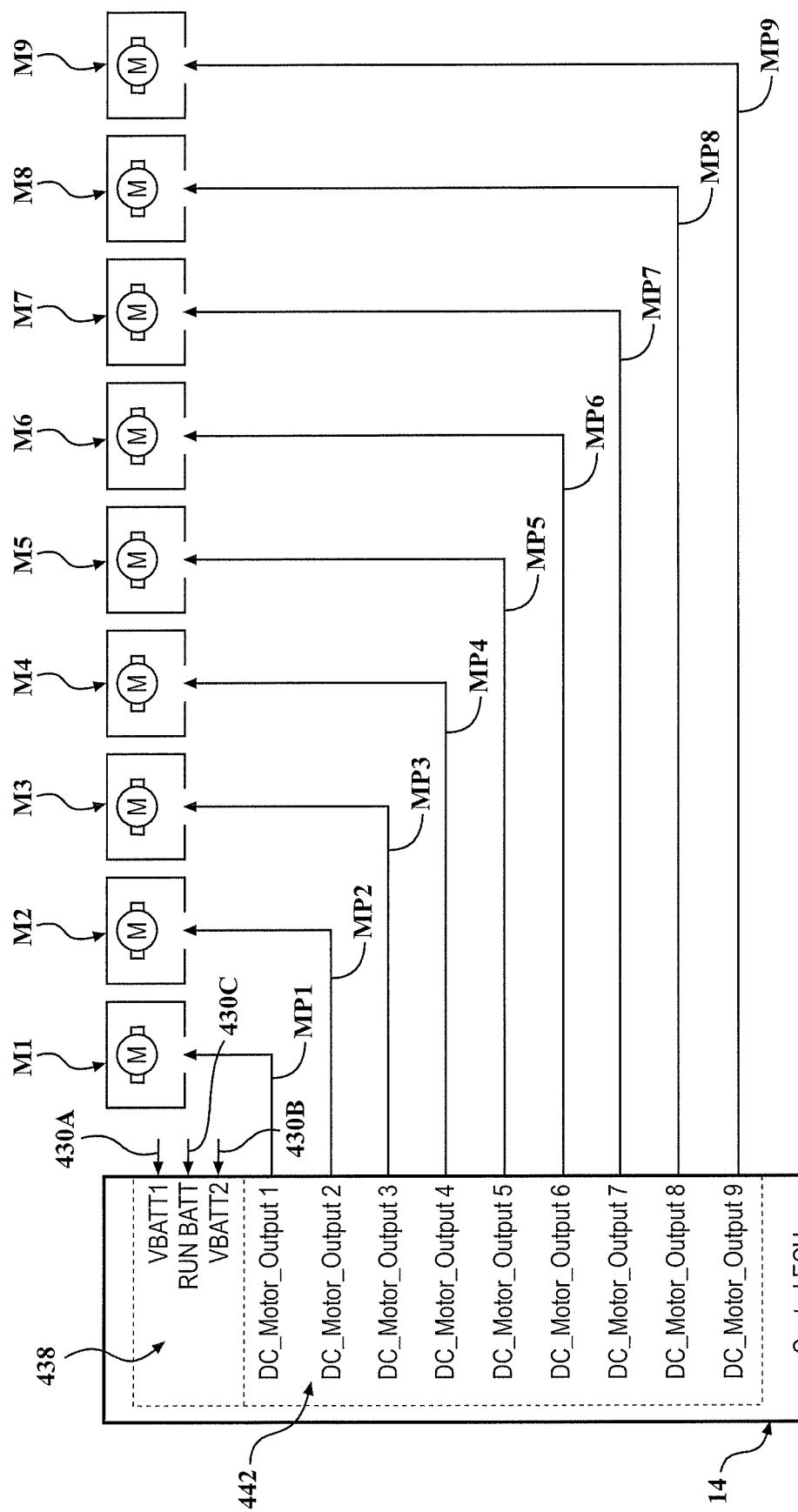
FIG. 10 is a schematic diagram showing electrical output connections of the central ECU of FIG. 9 to bi-directional direct current (DC) motors, according to one embodiment of the present invention.

The power supply connection block 438 of the central ECU 14, shown in FIGS. 9 and 10, includes electrical input connections for battery supply voltage 430A, 430B and vehicle running battery supply voltage 430C.

The DC motor power stage connection block 442 of the central ECU 14, also shown in FIGS. 9 and 10, provides DC motor power outputs MP1-MP9 for a plurality of bi-directional DC motors M1-M9. Each of the DC motor power outputs MP1-MP9 includes high side and low side power HS1, LS1 as further illustrated in FIG. 8. FIG. 10 illustrates DC motor power outputs MP1-MP8 operatively coupled to respective bi-directional DC motors M1-M8 having a maximum running current draw of about 10 amps. An additional DC motor power output MP9 is also operatively coupled to bi-directional DC motor M9 having a maximum running current draw of about 5 amps. In one embodiment of the central ECU 14, bi-directional DC motors M1-M3 are attached to the driver seat 30, bi-directional DC motors M4-M6 are attached to the passenger seat 54, bi-directional DC motors M7 and M8 are attached to the adjustable pedals 74, 78, and bi-directional DC motor M9 is attached to the adjustable steering column 70. Any number of DC motor power outputs MP1-MP9 can be included in the DC motor power stage connection block 442 as desired for a specific application. Further, the DC motor power stage connection block 442 can be configured to support bi-directional DC motors M1-M9 with any combination of maximum running current based on the requirements of a specific application.

Figure 11:
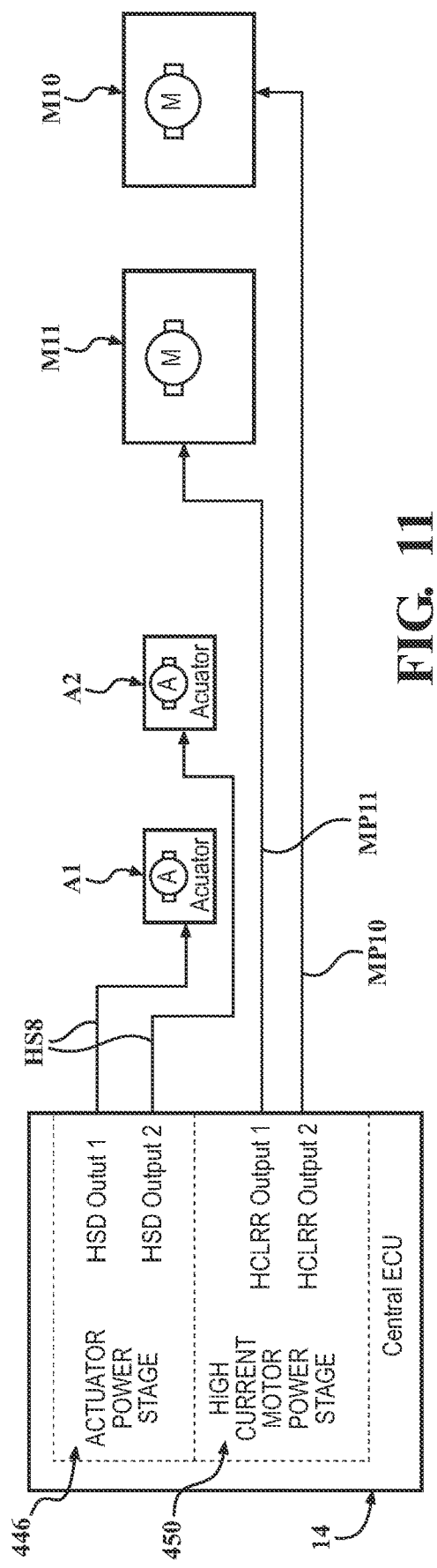
FIG. 11 is a schematic diagram showing electrical output connections of the central ECU of FIG. 9 to bi-directional DC motors and actuators, according to one embodiment of the present invention.

The actuator power stage connection block 446 of the central ECU 14, shown in FIGS. 9 and 11, provides high side power output HS8 to actuators A1, A2 having a maximum running current draw of about 10 amps. The actuator power stage connection block 446 can include any number of power outputs HS8 as desired for a specific application.

The high current motor power stage connection block 450 of the central ECU 14, shown in FIGS. 9 and 11, includes two high current power outputs MP10, MP11 providing high and low side power HS3, LS3 to bi-directional DC motors M10, M11 having a maximum running current draw of up to about 42 amps. The high current motor power stage connection block 450 can be configured to support any required number of high current power outputs MP10, MP11. In the embodiment shown in FIG. 11, the high current bi-directional DC motors M10, M11 provide seat back recline motor 122M function for the driver and passenger seats 30, 54, respectively.

Figure 12:
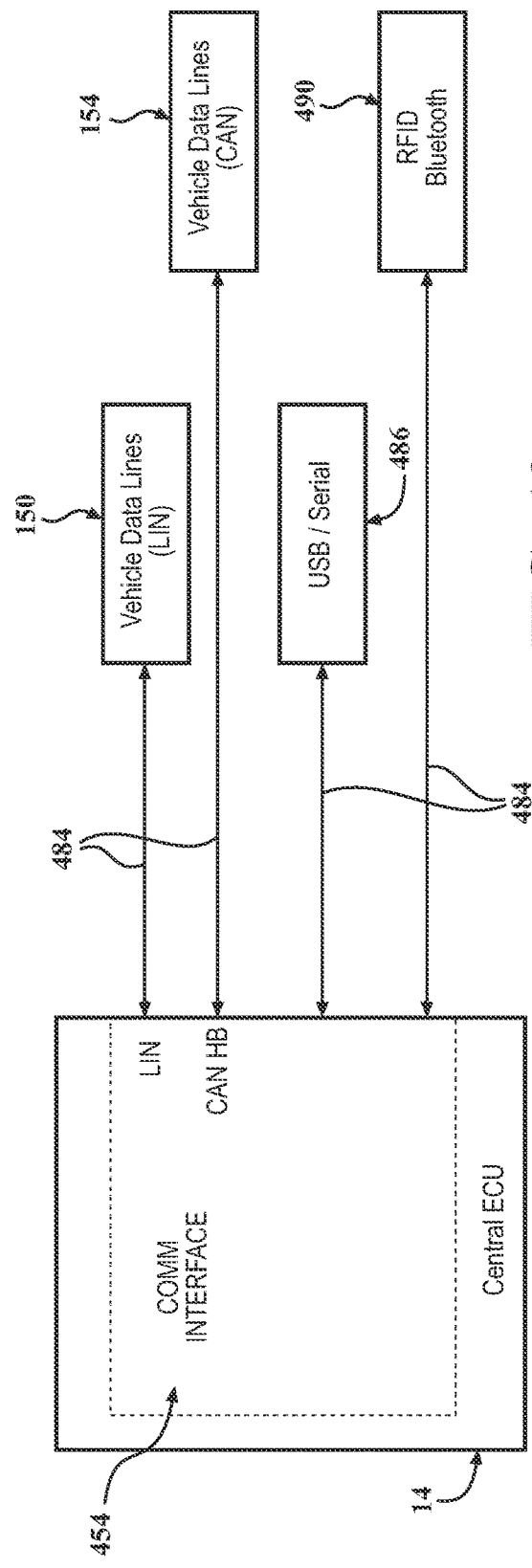
FIG. 12 is a schematic diagram of electrical connections between the central ECU of FIG. 9 and communication networks, according to one embodiment of the present invention.

The communication interface block 454 of the central ECU 14, shown in FIGS. 9 and 12, includes electrical input/output connections 484 for vehicle data lines which include communication networks, such as LIN interface 150 and CAN interface 154. Other communication network interface connections for USB 486, Serial 486, RFID 490, Bluetooth 490, etc., can be included in the communication interface connection block 454 or as part of a separate communication interface connection block 454 as desired for a specific application.

Figure 13:
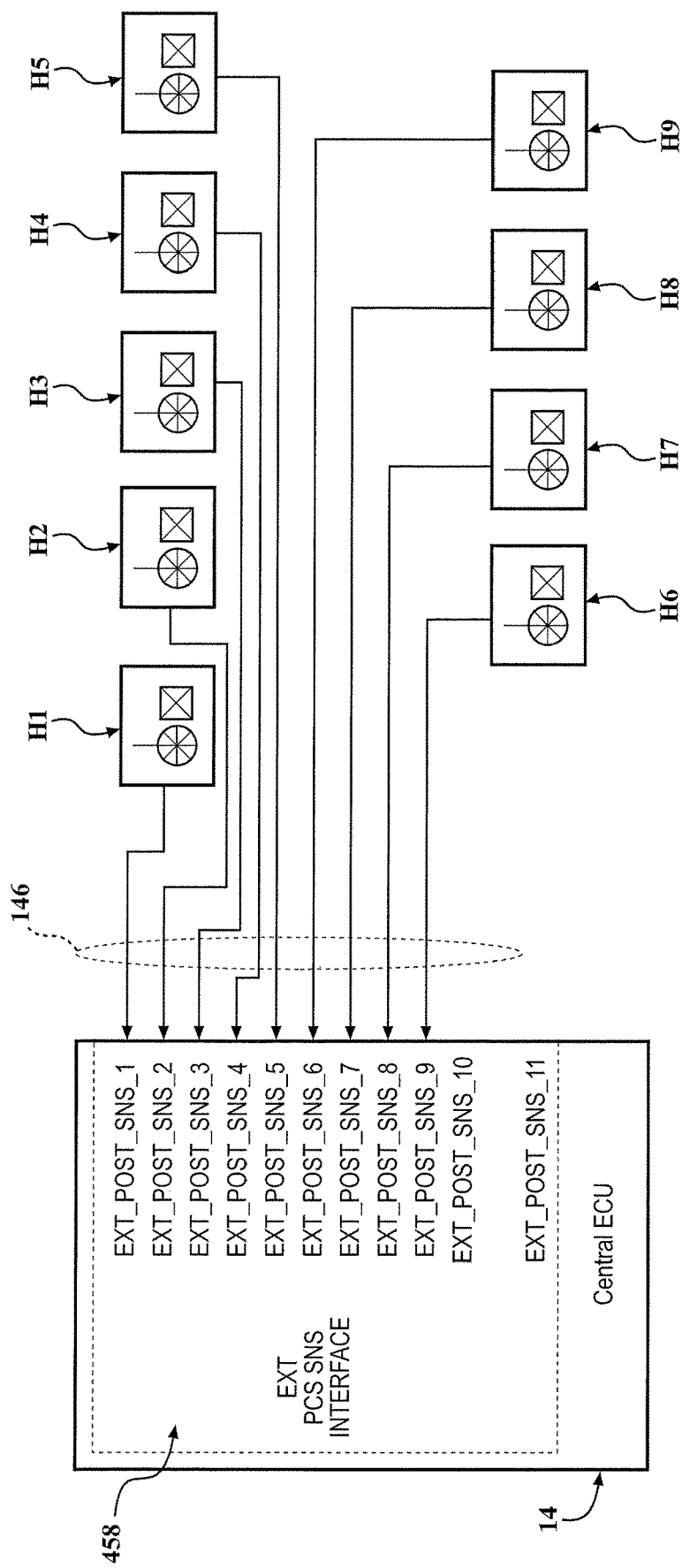
FIG. 13 is a schematic diagram of input feedback transmitted to the central ECU of FIG. 9 from a plurality of motor position sensors, according to one embodiment of the present invention.

The external position sensor interface connection block 458 of the central ECU 14, shown in FIGS. 9 and 13, receives input feedback 146 from motor position sensors H1-H9 associated with specific bi-directional DC motors M1-M9. The motor position sensors H1-H9 are typically Hall Effect sensors 130. In the embodiment shown in FIG. 13, each of the Hall Effect sensors H1-H9 provide feedback of the positional status of the respective bi-directional DC motor M1-M9.

Figure 14:
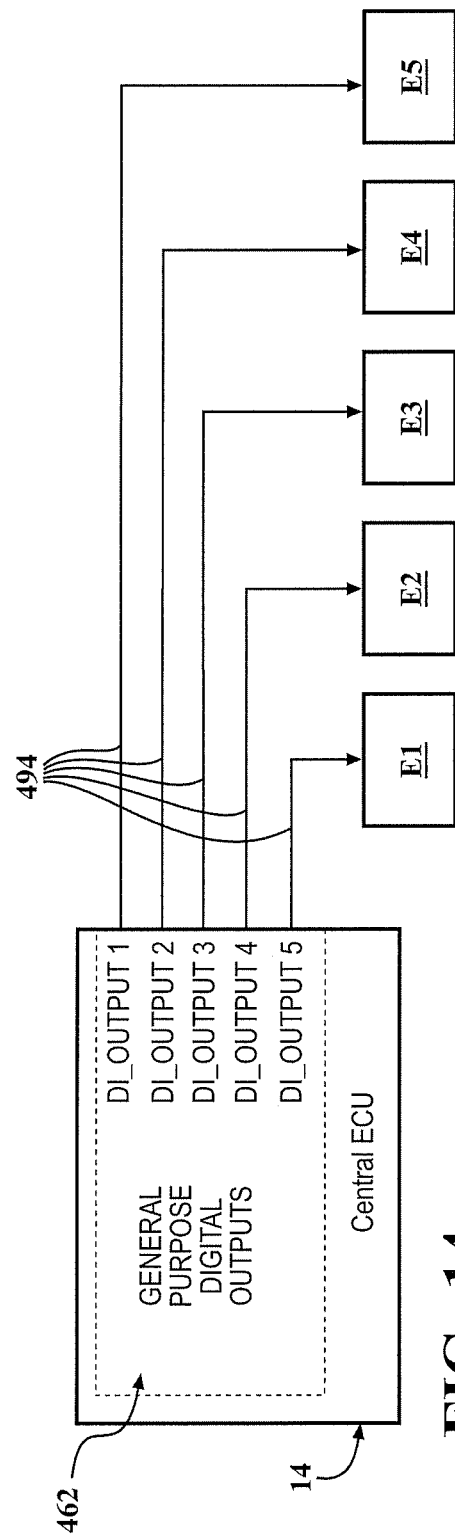
FIG. 14 is a schematic diagram of electrical output connections between the central ECU of FIG. 9 and electronic devices, according to one embodiment of the present invention.

The general-purpose digital output connection block 462 of the central ECU 14, shown in FIGS. 9 and 14, is configurable to selectively provide output power 494 to electronic devices E1-E5 as desired for a specific application. For example, the general-purpose digital output connection block 462 can selectively provide power to illumination devices 178.

Figure 15:
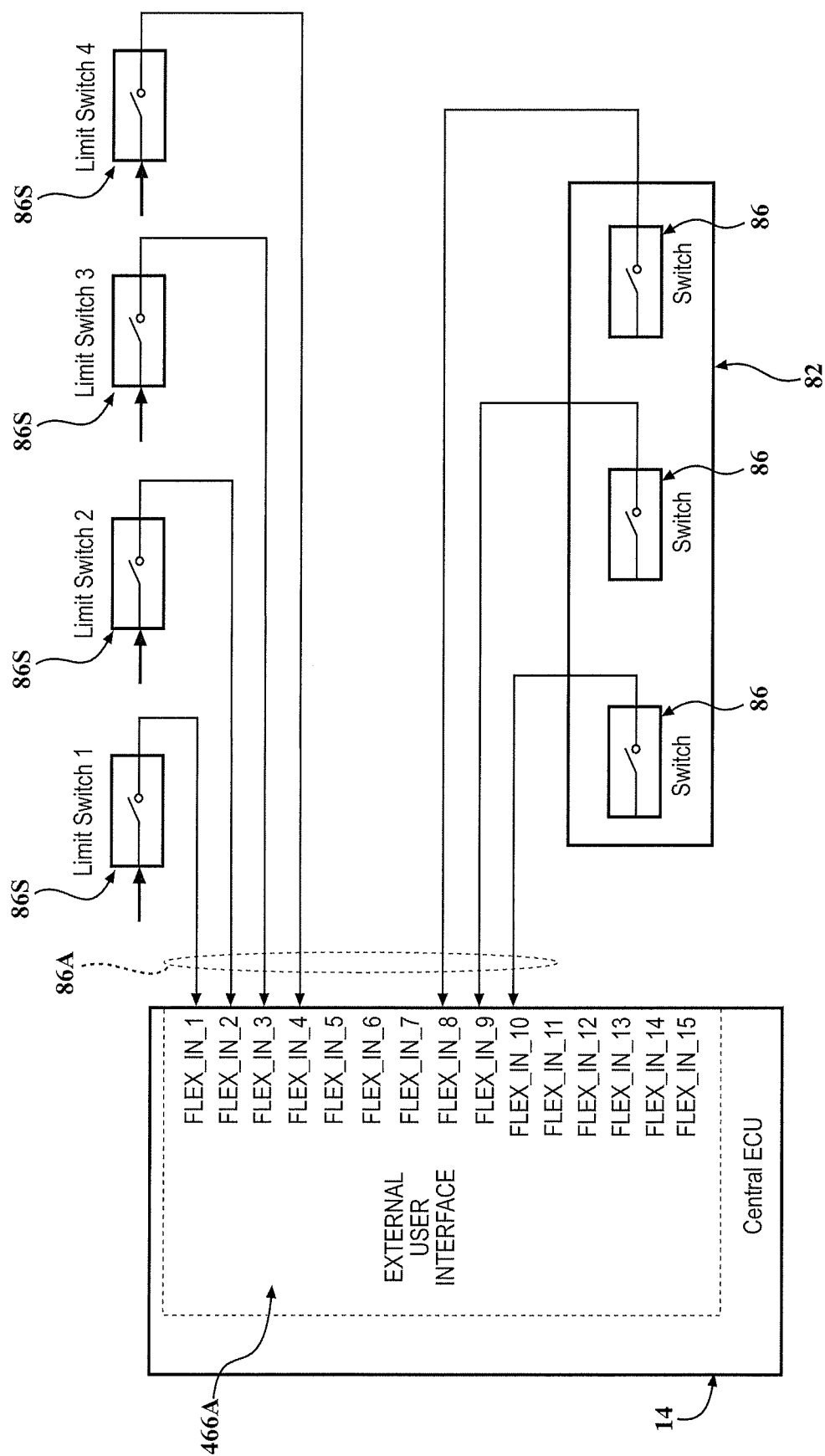
FIG. 15 is a schematic diagram of electrical input connections to the central ECU of FIG. 9 from limit switches and electrical switches, according to one embodiment of the present invention.

The first external user interface connection block 466A of the central ECU 14, shown in FIGS. 9 and 15, receives input instructions 86A from switches 86 and limit switches 86S. A plurality of switches 86 can be incorporated into a switch module 82. The switch input instructions 86A include position adjustment instructions and thermal instructions for the individual electronic devices 22 attached to vehicle seats 30, 54, 58. Additional input instructions 86A can be received by the first external user interface connection block 466A relating to adjustment requests for one or more of the steering column 70, the accelerator and brake pedals 74, 78, the outer mirrors 66, 66', individual door locks 182, and selection of specific memory settings, as non-limiting examples.

Figure 16:
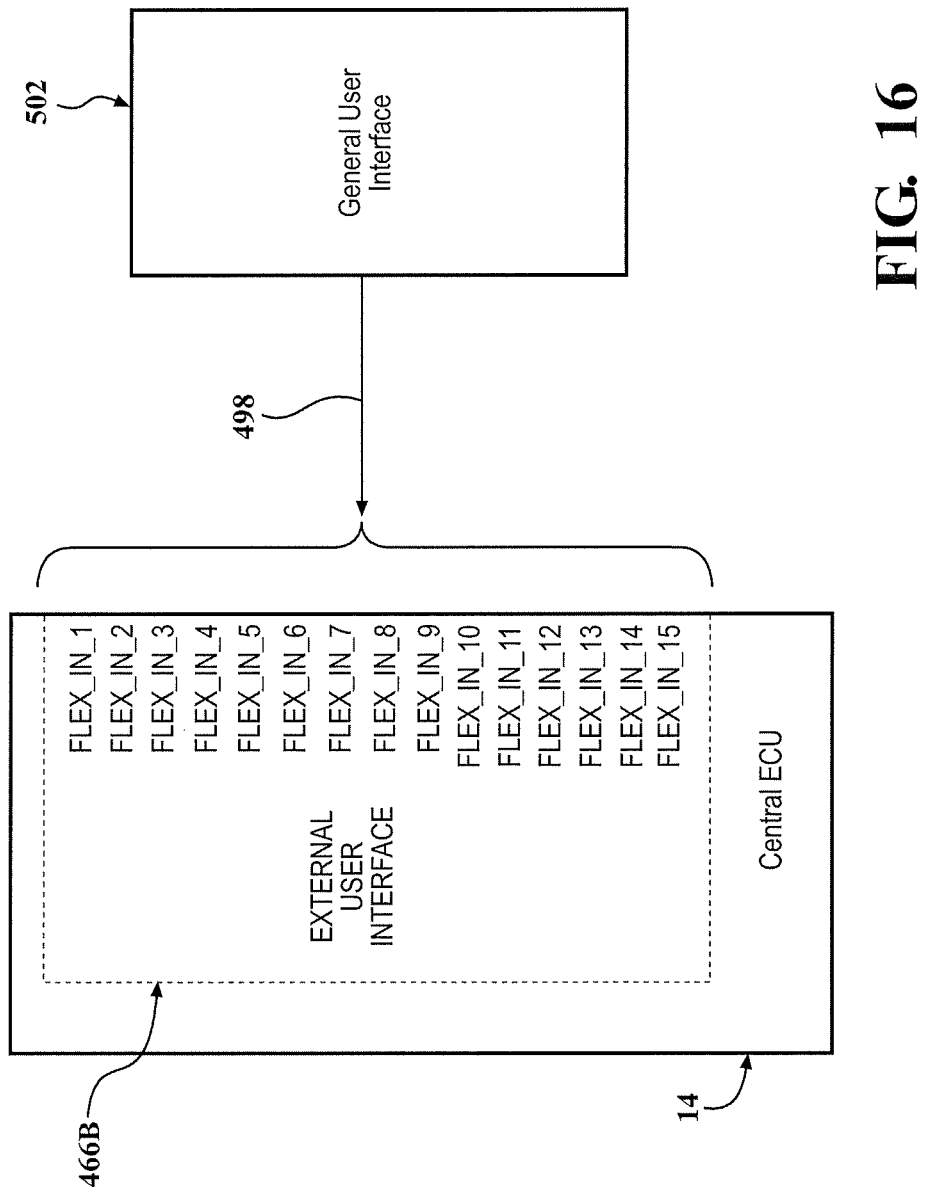
FIG. 16 is a schematic diagram of electrical input connections to the central ECU of FIG. 9 from a general user input interface, according to an embodiment of the present invention.

The second external user interface connection block 466B of the central ECU 14, shown in FIGS. 9 and 16, receives logic and/or analog inputs 498 from a general user input interface 502.

Figure 17:
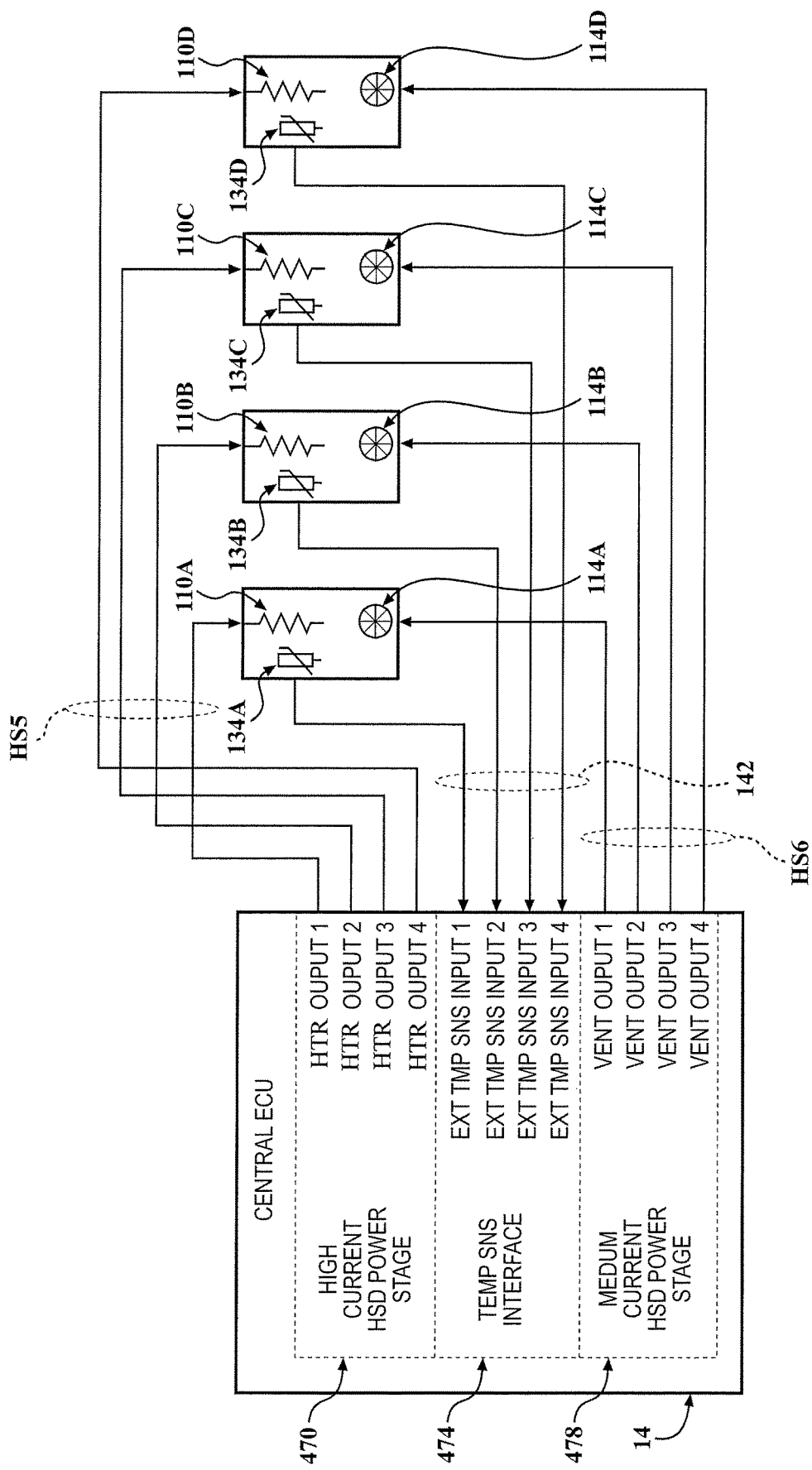
FIG. 17 is a schematic diagram of electrical input and output connections between the central ECU of FIG. 9, heating systems, and venting systems, according to one embodiment of the present invention.

The high current high side driver (HSD) power stage connection block 470, the external temperature sensor interface connection block 474, and the medium current HSD power stage connection block 478 of the central ECU 14 are shown in FIGS. 9 and 17. The high current HSD power stage connection block 470 selectively provides HSD power HS5 to heating systems 110A-110D associated with the vehicle seats 30, 54, 58. In the embodiment shown in FIG. 17, heating systems 110A, 110B are attached to the seat cushion 94 and the seat back 98 of the driver seat 30, respectively, with heating systems 110C, 110D attached to the seat cushion 94 and the seat back 98 of the passenger seat 54, respectively. The heating systems 110A-110D include heating elements configured to heat the seat surfaces 116. The current drawn by each heating system 110A-110D is generally about 10 amps or less.

In the embodiment shown in FIG. 17, the medium current HSD power stage connection block 478 selectively provides HSD power HS6 to venting systems 114A-114D associated with the vehicle seats 30, 54, 58. In the embodiment shown in FIG. 17, venting systems 114A, 114B are attached to the seat cushion 94 and the seat back 98 of the driver seat 30, respectively, with venting systems 114C, 114D attached to the seat cushion 94 and the seat back 98 of the passenger seat 54, respectively. The venting systems 114A-114D may include a blower and/or a ventilation fan that ventilates the seat surfaces 116. In addition, the venting systems 114A-114D can be configured to cool the vehicle seat 30, 54, 58. The current drawn by each venting system 114A-114D is generally about 5 amps or less. Thermistors 134A-134D monitor the temperature near each of the heating systems 110A-110D. In the embodiment shown in FIG. 17, each thermistor 134A-134D provides feedback 142 to the external temperature sensor interface connection block 474 of a thermal status of each heating system 110A-110D.

Figure 18:
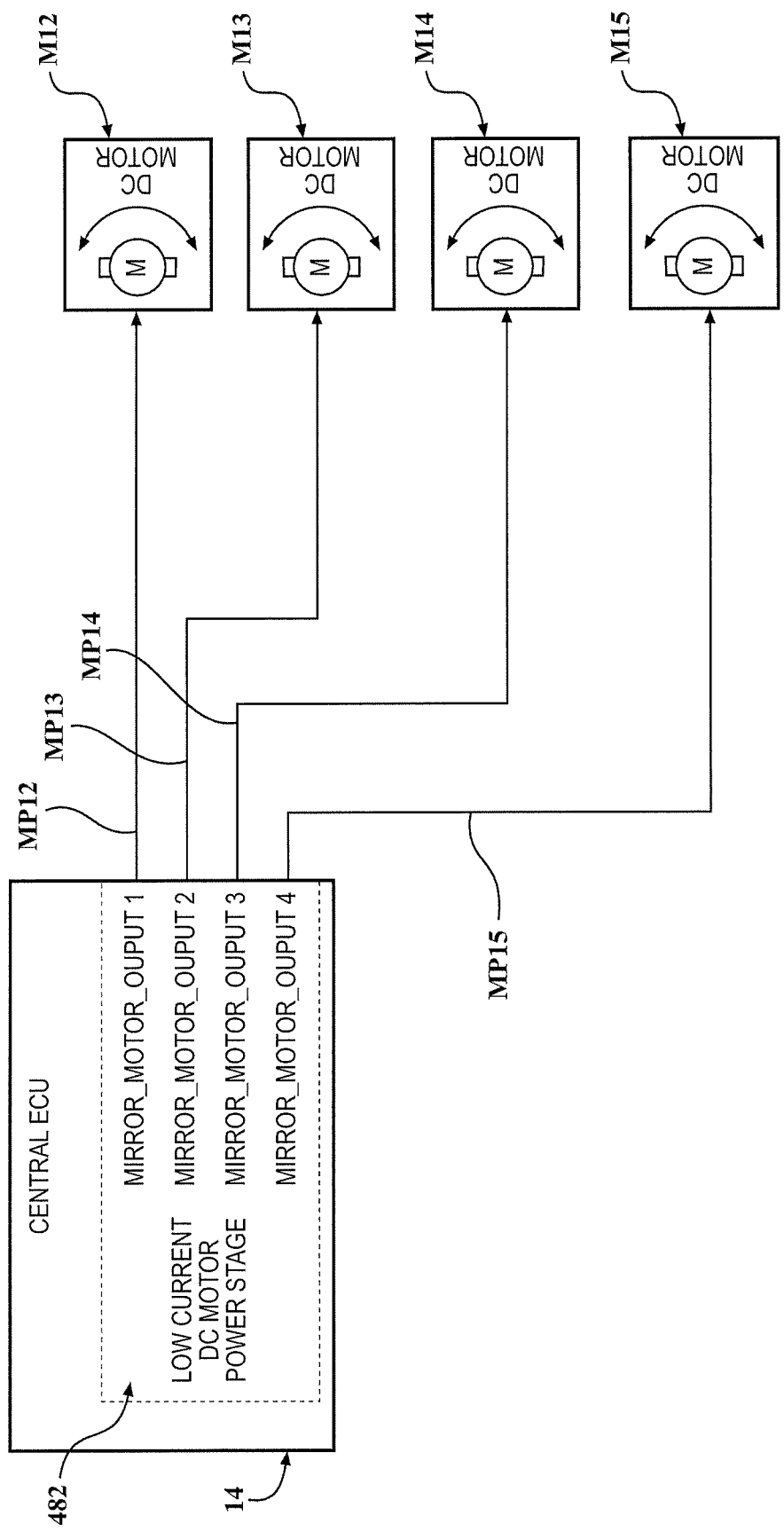
FIG. 18 is a schematic diagram of electrical output connections between the central ECU of FIG. 9 and bi-directional DC motors, according to one embodiment of the present invention.

The low current DC motor power stage connection block 482 of the central ECU 14 is show in FIGS. 9 and 18. In the embodiment shown in FIG. 18, the low current DC motor power stage connection block 482 selectively provides power outputs MP12-MP15 to bi-directional DC motors M12-M15 having a maximum running current draw of about 1.5 amps. Each of the supplied power outputs MP12-MP15 includes high side power HS7 and low side power LS7. In the embodiment shown in FIG. 18, the low current power outputs MP12-MP15 are operatively coupled to x-axis and y-axis mirror bi-directional DC motors 106E, 106F attached to each of the driver side 48 and passenger side 56 outer mirrors 66, 66'.

Figure 19:
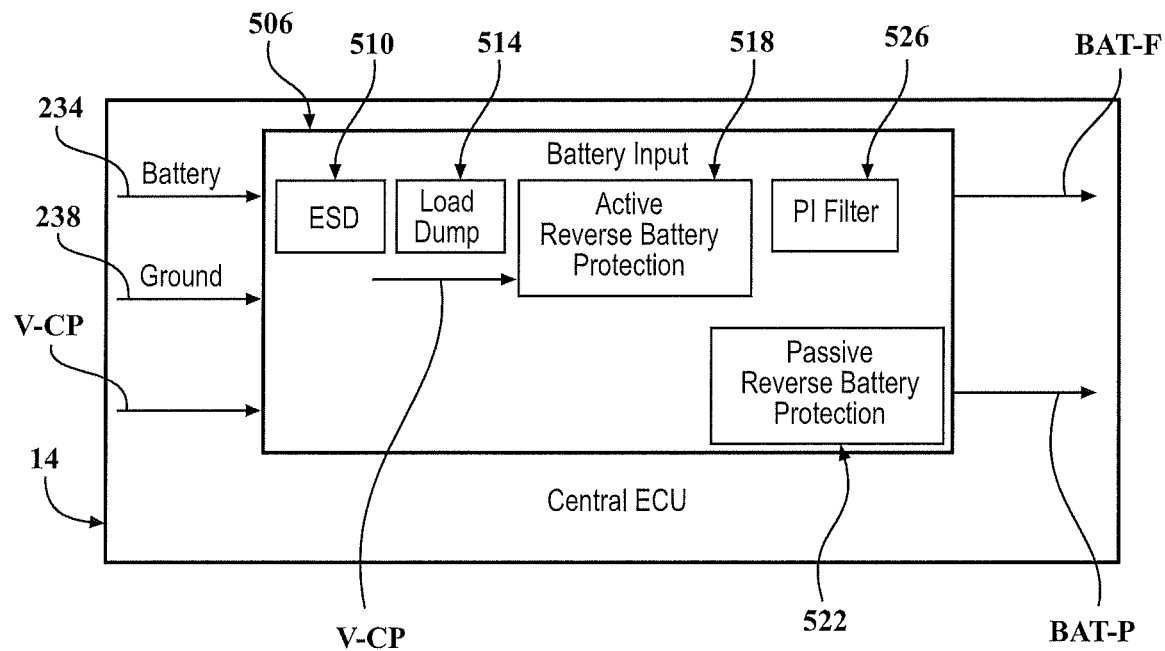
FIG. 19 is a block diagram of a battery input function block of the central ECU of FIGS. 4A and 4B, according to one embodiment of the present invention.

A battery input function block 506 within the central ECU 14 is shown in FIG. 19. Battery power 234 and ground 238 are provided to the battery input function block 506. Included within the battery input function block 506 are electronic circuits relating to electrostatic discharge (ESD) 510, load dump 514, active reverse battery protection 518, passive reverse battery protection 522, and a PI filter 526.

Load dump 514 electronic circuitry suppresses voltage, spikes that occur when the battery power 234 is disconnected while an engine in the vehicle 18 is in operation. Active and passive reverse battery protection circuitry 518, 522 protects the central ECU 14 in the case that battery polarity is reversed. The PI filter 526 generally includes a shunt capacitor and an L-section filter electronically connected to reduce ripple in the battery power 234. The battery input function block 506 provides filtered battery power BAT-F as well as protected battery power BAT-P. The protected battery power BAT-P passes through electronic circuitry to reduce the effects of overcharge, over discharge, short circuit, over current, and temperature effects. High side gate drive voltage V-CP is provided to the battery input function block 506 and to the active reverse battery protection 518. The high side gate drive voltage V-CP is generated by one of the multiple MOSFET drivers 406A-406C.

Figure 20:
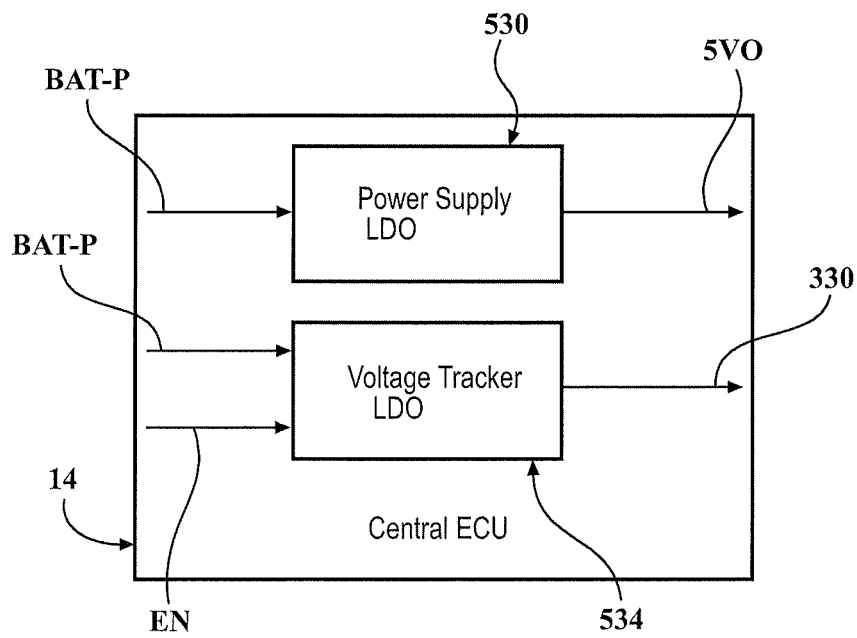
FIG. 20 is a block diagram of a power supply low drop out (LDO) module and a voltage tracker LDO module of the central ECU of FIGS. 4A and 4B, according to one embodiment of the present invention.

Referring to FIG. 20, the central ECU 14 includes a power supply low dropout (LDO) module 530 and a voltage tracker LDO module 534. The protected battery power BAT-P is provided to the power supply LDO module 530 and to the voltage tracker LDO module 534. In the embodiment shown in FIG. 20, the power supply LDO module 530 is rated for 150 milliamp (mA) and generates a 5-volt 5VO output. The voltage tracker LDO module 534 generates a 5-volt auxiliary power output 330 from the protected battery power BAT-P and an enable EN signal. The voltage tracker LDO module 534 is typically used to generate power for electronic devices 22 and electronic sensors 26 that require low current consumption and are permanently connected to the vehicle 18 battery.

Figure 21:
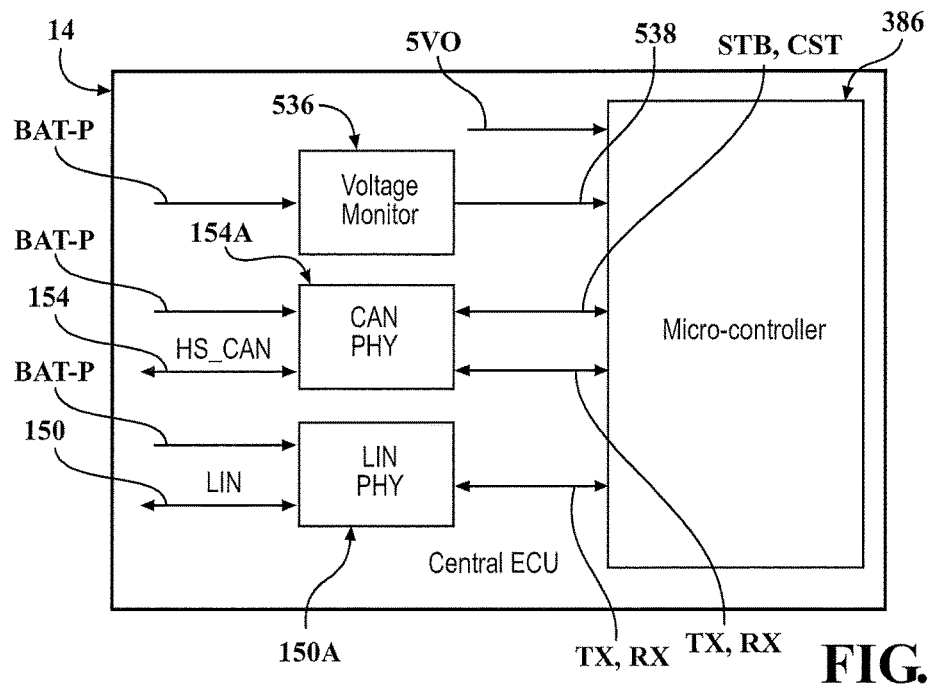
FIG. 21 is a block diagram of communication interfaces and a voltage monitor interface of the central ECU of FIGS. 4A and 4B, according to one embodiment of the present invention.

Communication network interfaces 150A, 154A, a voltage monitor interface 536, and a 5-volt 5VO input to the micro-controller 386 are illustrated in FIG. 21. The 5-volt 5VO input is supplied by the power supply LDO module 530. The voltage monitor interface 536 receives the protected battery power BAT-P and provides analog feedback 538 to the micro-controller 386 indicative of the instantaneous voltage level of the protected battery power BAT-P. The communication network interfaces 150A, 154A include a controller area network (CAN) physical layer (PHY) interface 154A and a local interconnect network (LIN) physical layer (PHY) interface 150A. Other optional communication network interfaces 150A, 154A can be included, such as universal serial bus (USB), serial, radio-frequency identification (RFID), Bluetooth, Wi-Fi (IEEE 802.11x), and high speed CAN (HS-CAN), as non-limiting examples and as desired for specific applications. The CAN PHY interface 154A and the LIN PHY interface 150A are supplied with protected battery power BAT-P. The CAN PHY interface 154A receives and transmits status bytes STB and control system transactions CST with the micro-controller 386. Data is also transmitted TX and received RX between the CAN PHY interface 154A and the micro-controller 386. Further, the CAN PHY interface 154A also transmits and receives data with the high-speed CAN (HS-CAN) communication network 154. Similarly, the LIN PHY interface 150A transmits TX and receives RX data between the micro-controller 386 and the LIN communication network 150.

Figure 22:
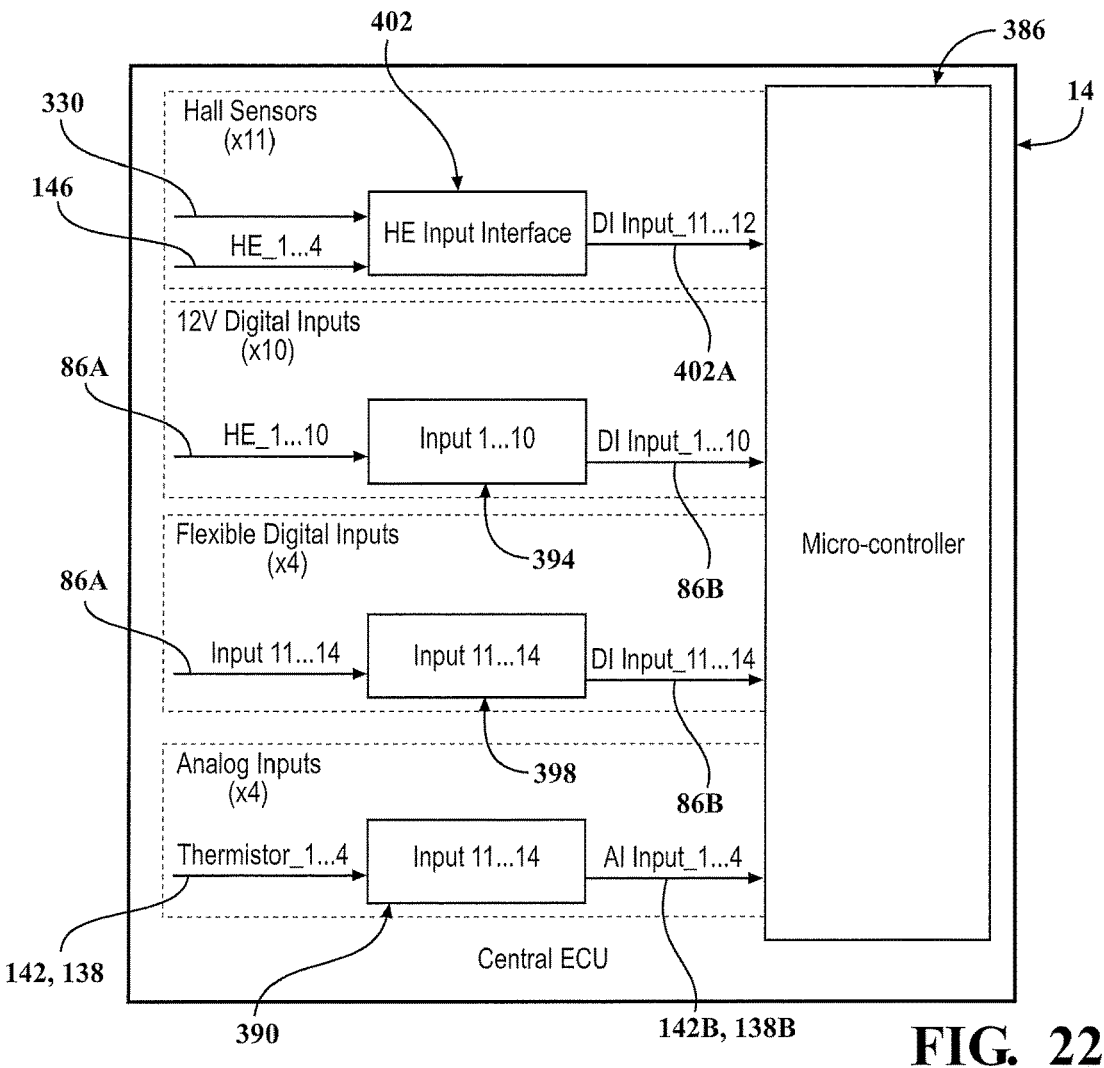
FIG. 22 is a block diagram of input interfaces of the central ECU of FIGS. 4A and 4B, according to one embodiment of the present invention.

The central ECU 14 includes a Hall Effect (HE) input interface 402, a 12-volt digital input interface 394, a flexible digital input interface 398, and analog input interface 390, as shown in FIG. 22. As shown in FIG. 8, a bi-directional DC motor 106 operatively coupled to the central ECU 14 includes a Hall Effect position sensor 130 providing feedback 146 about a positional status of the bi-directional DC motor 106. The Hall Effect sensor feedback 146 is received by the HE input interface 402 shown in FIG. 22. The 5-volt auxiliary power output 330 is also supplied to the HE input interface 402. Digital output 402A from the HE input interface 402 is received by the micro-controller 386.

Referring to FIG. 22, the 12-volt digital input interface 394 and the flexible digital input interface 398 generally receive input instructions 86A from switches 86, and transfer received instructions 86B to the micro-controller 386. The analog input interface 390 generally receives feedback 142 from thermistors 134 and transfers the received feedback 142B to the micro-controller 386.

Typical vehicle seats 30, 54, 58 include one or more electronic weight sensors 126 to detect if an occupant and/or an item is present on the seat surface 116 of the vehicle seat 30, 54, 58. Further, vehicle seats 30, 54, 58 may include a seat belt sensor to detect if a seat belt is in a latched or unlatched condition. Feedback 138 from the weight sensors 126 can be provided to the analog input interface 390 with the analog input interface 390 transferring the received weight sensor 126 feedback 138B to the micro-controller 386. Other sensor feedback, such as a seat belt sensor, can be provided to one of the input interfaces 394, 398, 390 to be transferred to the micro-controller 386. The micro-controller 386 can include the weight sensor 126 feedback 138B and the seat belt sensor feedback when the micro-controller 386 creates command instructions. Further, the central ECU 14 can provide the seat belt sensor feedback and/or the weight sensor 126 feedback 138 to other electronic control modules 158, 162 within the vehicle 18 through the CAN interface 154 and/or LIN interface 150. For example, the central ECU 14 can provide the seat belt sensor feedback, the weight sensor 126 feedback 138, and/or a command instruction created by the micro-controller 386 indicating the occupancy status of a specific vehicle seat 30, 54, 58 through the CAN interface 154 to a distributed electronic control module 158, 162, such as a vehicle climate control module 158 or an occupancy classification system module 162.

Figure 23:
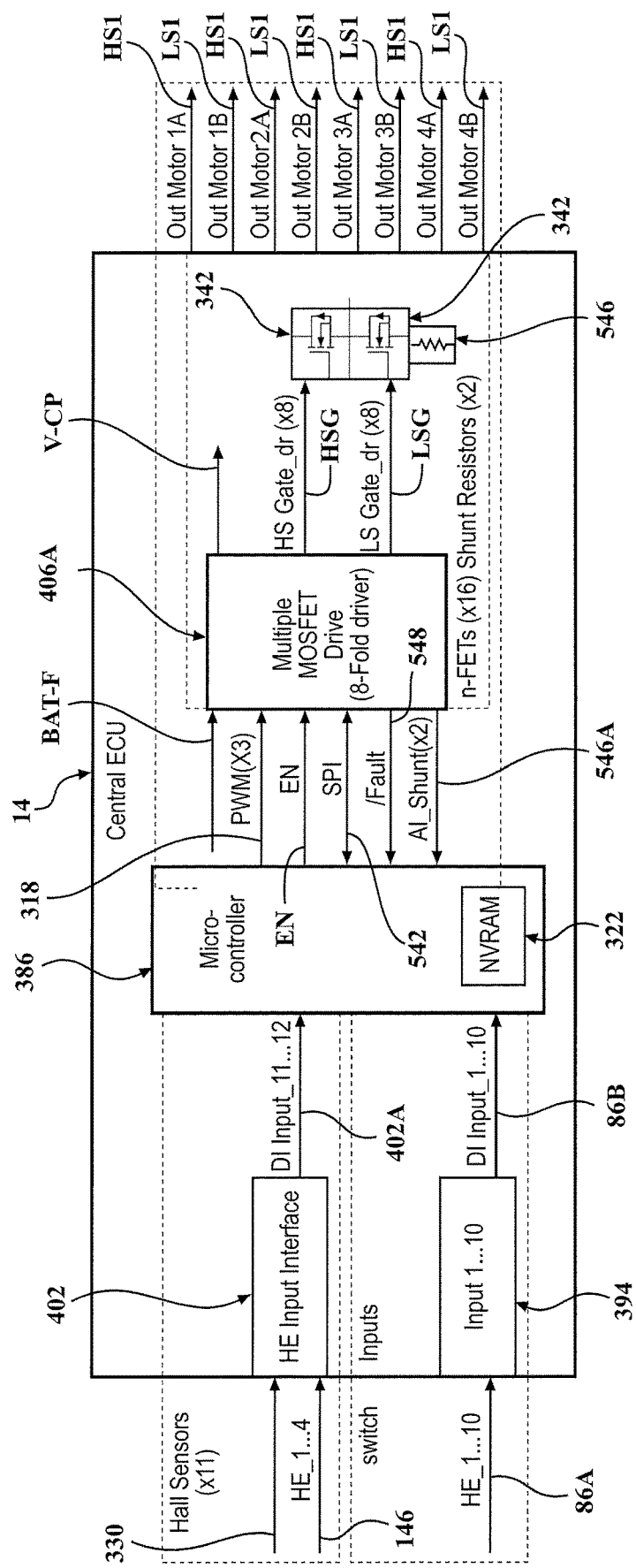
FIG. 23 is a block diagram of a portion of the central ECU of FIGS. 4A and 4B showing a first multiple metal oxide semiconductor field effect transistor (MOSFET) driver, according to one embodiment of the present invention.

The central ECU 14 includes pulse width modulation (PWM) motor control 318 and provides PWM power to a plurality of motor outputs HS1, LS1, as illustrated in FIG. 23. The electronic circuitry associated with the PWM motor control 318 includes one or more input interfaces 402, 394, one or more multiple MOSFET drivers 406A-406C, and solid-state relays 342, 342'. Some of the electrical inputs 38 to the central ECU 14 related to the PWM motor control 318 are filtered battery power BAT-F, Hall Effect sensor 130 position feedback 146, and switch instructions 86A. Non-volatile random-access memory (NVRAM) 322 is included in the micro-controller 386 for storage of memory settings, service information, and other data. The central ECU 14 receives Hall Effect sensor 130 position feedback 146 through the Hall Effect input interface 402. Further, the central ECU 14 receives switch inputs 86A through a 12-volt digital input interface 394. The switch inputs 86A provide instructions to the micro-controller 386 requesting a change in position of one or more of the bi-directional DC motors 106, 106A, 122.

Outputs from the micro-controller 386, as shown in FIG. 23, include one or more PWM motor control 318 instructions and an enable signal EN. The multiple MOSFET driver 406A provides high side gate drive voltage V-CP output. A serial peripheral interface 542 transfers signals and command instructions between the micro-controller 386 and the first multiple MOSFET driver 406A. Further, the filtered battery power BAT-F is provided to the first multiple MOSFET driver 406A.

The micro-controller 386 generates PWM motor control 318 instructions that are distributed to the first multiple MOSFET driver 406A, as illustrated in FIG. 23. The PWM motor control 318 instructions are generated by the micro-controller 386 based in part on one or more of received switch instructions 86B, received instructions through the CAN interface 154 and/or LIN interface 150, received Hall Effect sensor 130 feedback 402A, and preprogrammed instructions stored within the micro-controller 386.

In the embodiment illustrated in FIG. 23, the multiple MOSFET driver 406A is an 8-fold driver, i.e., a multiple MOSFET driver 406A capable of driving eight pairs of high side and low side gate drivers HSG, LSG. Each of the high side and low side gate drivers HSG, LSG trigger a respective solid-state relay 342, 342'. Each solid-state relay 342, 342' includes a relay output configured to provide high side power HS1 or low side power LS1 to one of the bi-directional DC motors 106, 106A, 122. Shunt resistors 546 monitor current draw through the solid-state relays 342, 342'. The multiple MOSFET driver 406A transmits an analog shunt current feedback 546A to the micro-controller 386 indicative of the amount of current drawn by the solid-state relays 342. Further, the multiple MOSFET driver 406A provides fault feedback 548 to the micro-controller 386 if the multiple MOSFET driver 406A detects a fault condition. The micro-controller 386 can detect certain fault conditions since the micro-controller 386 receives analog shunt current feedback 546A and fault feedback 548 from the multiple MOSFET driver 406A.

Figure 24:
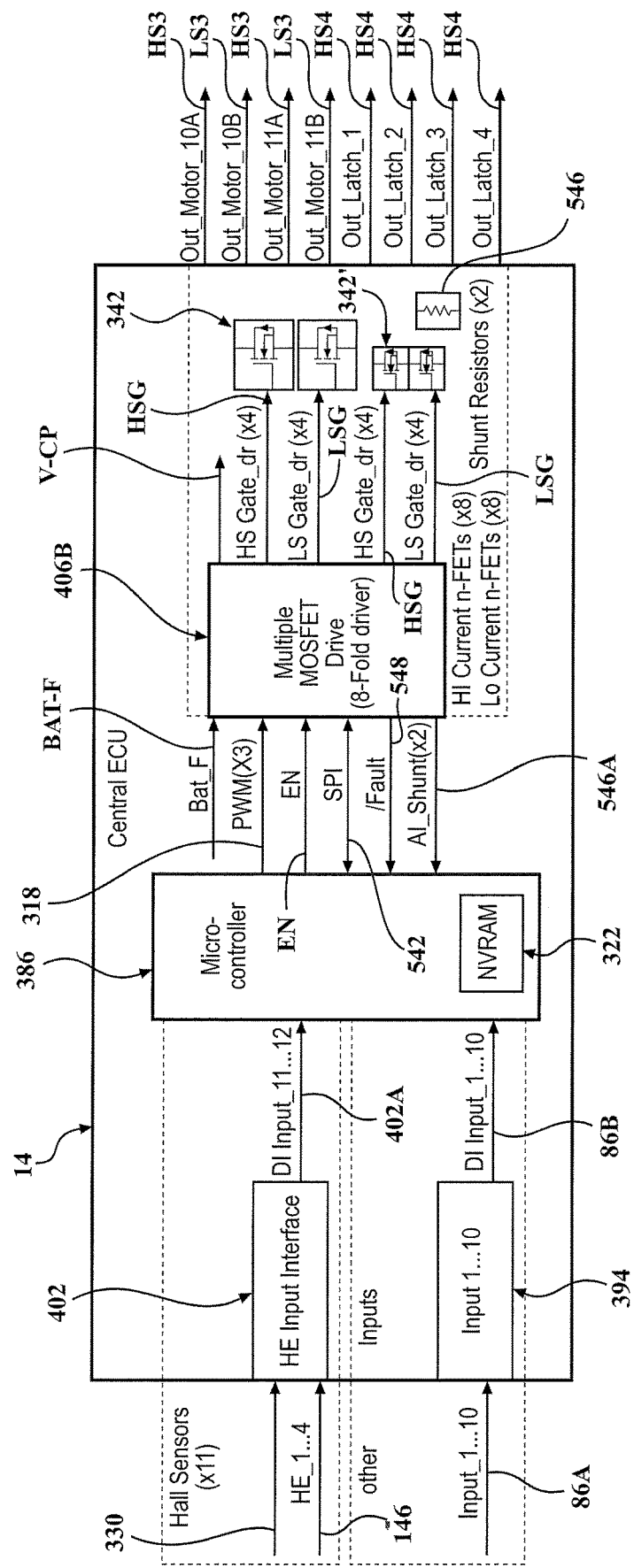
FIG. 24 is a block diagram of a portion of the central ECU of FIGS. 4A and 4B showing a second multiple MOSFET driver, according to one embodiment of the present invention.

The central ECU 14 includes a second multiple MOSFET driver 406B configured to drive a combination of bi-directional DC motors 106, 106A, 122 and uni-directional latches 186, as illustrated in FIG. 24. The multiple MOSFET driver 406B illustrated in FIG. 24 is an 8-fold driver with four pairs of high side gate drivers HSG and low side gate drivers LSG operatively connected to high current solid-state relays 342, and four pairs of high side gate drivers HSG and low side gate drivers LSG operatively connected to low current solid-state relays 342'. The high current solid-state relays 342 provide high side power HS3 and low side power LS3 to attached DC motors 106, 106A, 122. The low current solid-state relays 342' provide high side power HS4 to uni-directional latches 186. Any combination of high and low current solid-state relays 342, 342' may be selected for a particular multiple MOSFET driver 406B depending on the specific requirements of a selected application. Further, the micro-controller 386 is configured to provide PWM motor control 318 instructions to the multiple MOSFET driver 406B based in part on feedback 146 received from Hall Effect position sensors 130 associated with a specific bi-directional DC motors 106, 106A, 122. Optionally, the micro-controller 386 can generate the PWM motor control 318 instructions independent of feedback 146 received from Hall Effect position sensor 130 if a specific DC motor 106, 106A, 122 lacks a Hall Effect position sensor 130. Certain bi-directional DC motors 106, 106A, 122 lack an associated Hall Effect position sensor 130 since feedback 146 is not required for certain applications.

The electrical connections between the micro-controller 386 and the second multiple MOSFET driver 406B shown in FIG. 24 are similar to the first multiple MOSFET driver 406A shown in FIG. 23, i.e., they include PWM motor control 318 instructions, an enable signal EN, serial peripheral interface 542, analog shunt current feedback 546A, and fault feedback 548. Shunt resistors 546 monitor the current draw of the solid-state relays 342, 342', with the multiple MOSFET driver 406B providing analog shunt current feedback 546A and the fault feedback 548 to the micro-controller 386. Another input to the second multiple MOSFET driver 406B is filtered battery power BAT-F. The second multiple MOSFET driver 406B also provides a high side gate drive voltage V-CP output.

Figure 25:
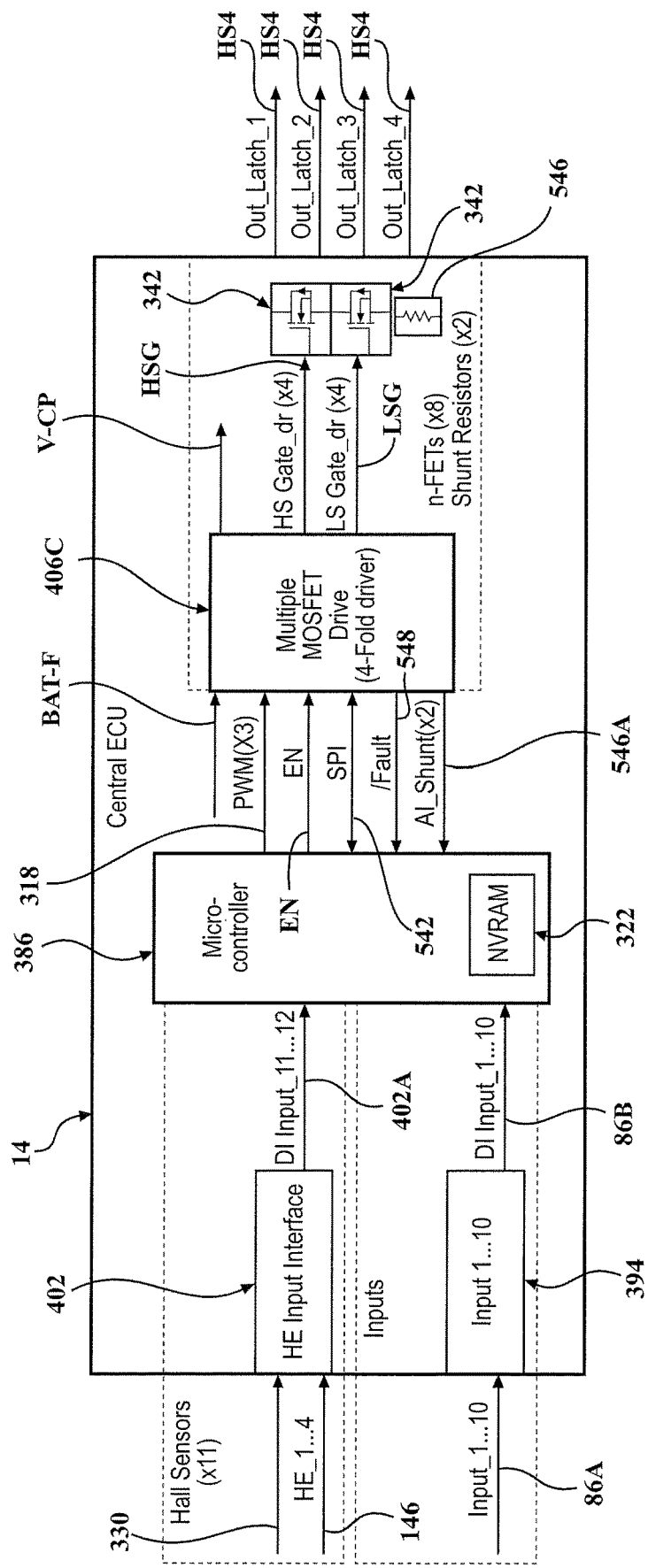
FIG. 25 is a block diagram of a portion of the central ECU of FIGS. 4A and 4B showing a third MOSFET driver, according to one embodiment of the present invention.

A third multiple MOSFET driver 406C is illustrated in FIG. 25. The third multiple MOSFET driver 406C is a 4-fold driver 406C with four pairs of high side gate drivers HSG and low side gate drivers LSG. The high side gate drivers HSG and the low side gate drivers LSG control solid-state relays 342. Shunt resistors 546 monitor the current draw through the solid-state relays 342. The third multiple MOSFET driver 406C includes similar electrical inputs and electrical outputs to the first and second multiple MOSFET drivers 406A, 406B, i.e., it includes PWM motor control 318 instructions, an enable signal EN, serial peripheral interface 542, analog shunt current feedback 546A, fault feedback 548, a filtered battery power BAT-F, and a high side gate driver voltage V-CP output. The power output HS4 of the solid-state relays 342 are configured to provide power output to uni-directional latches 186. In certain configurations, the multiple MOSFET driver 406C can selectively control the high side and low side gate drivers HSG, LSG without using the PWM motor control 318.

As illustrated in FIGS. 23-25, the central ECU 14 can include any number of multiple MOSFET drivers 406A-406C, including combinations of 4-fold and 8-fold MOSFET drivers 406A-406C, as desired for a specific application. Further, the high side gate drivers and low side gate drivers HSG, LSG can electrically operate combinations of high current and low current solid-state relays 342, 342', as desired for a specific application. In one embodiment of FIGS. 23-25, high current solid-state relays 342 provide power output to a high current draw bi-directional DC motor 122, such as a recline motor 122, having a running current draw of up to about 42 amps. In addition, low current solid-state relays 342' provide power output to a low current draw bi-directional DC motor 106A, such as a seat mid-power motor 106A, with a running current draw in the range of about 5 to 7 amps.

Figure 26:
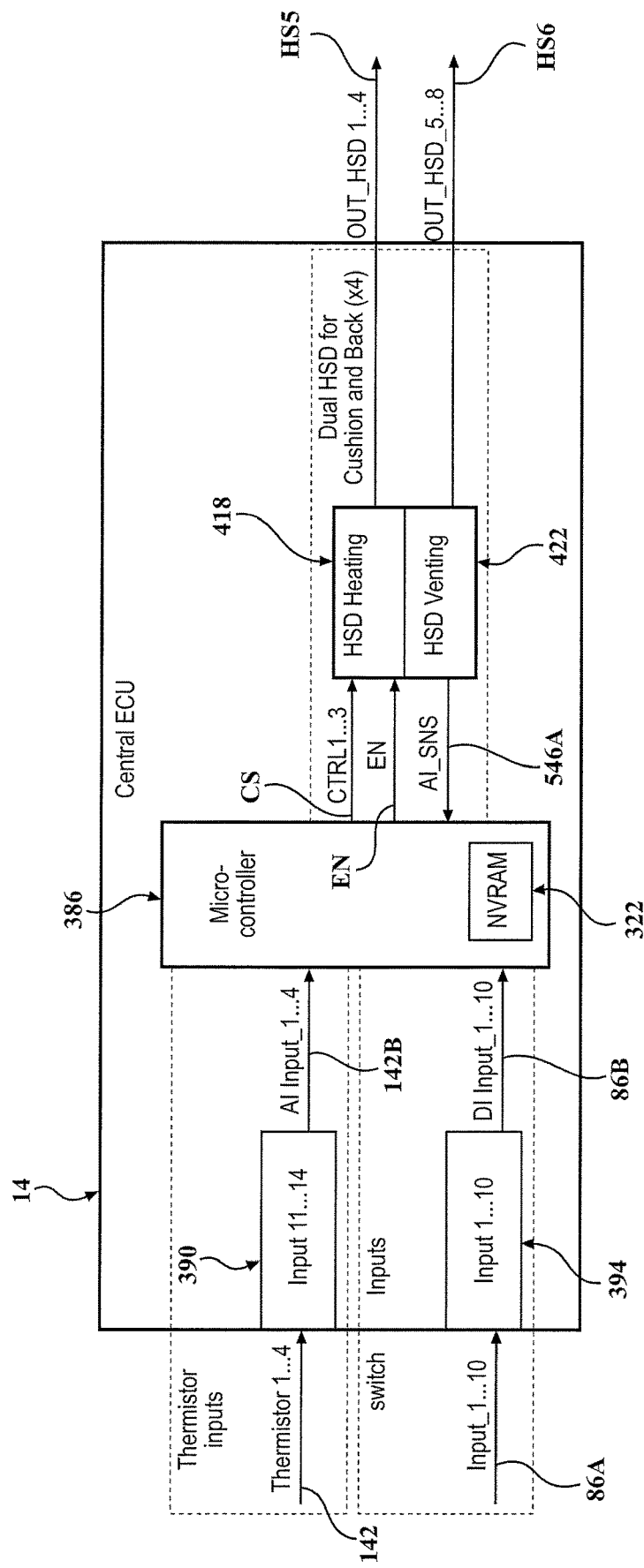
FIG. 26 is a block diagram of a portion of the central ECU of FIGS. 4A and 4B showing dual high side driver (HSD) modules, according to one embodiment of the present invention.

The central ECU 14 includes a plurality of dual high side driver (HSD) relays 418, 422 as shown in FIG. 26. The dual HSD relays 418, 422 include a first HSD relay 418 configured to provide high side power HS5 to a heating system 110, and a second HSD relay 422 configured to provide high side power HS6 to a venting system 114. The current draw out of each HSD relay 418, 422 is about 5 amps to 7 amps. The number of dual HSD relays 418, 422 can be selected to provide high side power HS5, HS6 to a required number of heating and venting systems 110, 114. For example, if the specific application requires support for (4) heating and venting systems 110, 114, then the central ECU 14 can be configured with (4) dual HSD relays 418, 422.

As illustrated in FIGS. 17, 22, and 26, each heating system 110 includes a thermistor 134 configured to provide feedback 142, 142B to the micro-controller 386. The micro-controller 386 provides control instructions CS and an enable signal EN to the dual HSD relays 418, 422 in response to received feedback 142, 142B from thermistors 134 and received inputs 86A, 86B from switches 86. The dual HSD relays 418, 422 may include a current sensor such that an analog current feedback 546A is provided to the micro-controller 386 indicative of the current draw through the dual HSD relays 418, 422. The analog current feedback 546A to the micro-controller 386 allows the micro-controller 386 to monitor the operating status of the dual HSD relays 418, 422 and determine the operating condition of the electronically coupled heating and venting systems 110, 114.

Figure 27:
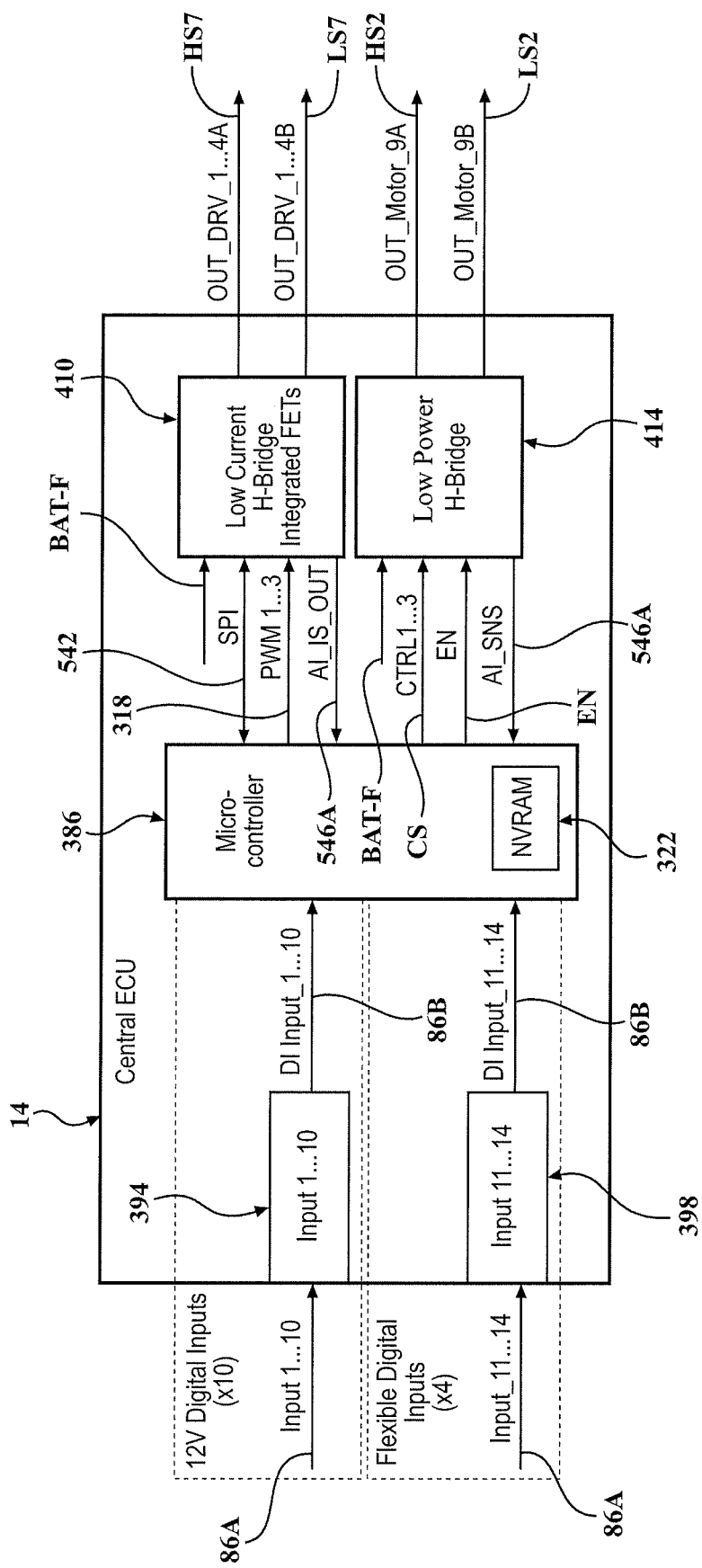
FIG. 27 is a block diagram of the central ECU of FIGS. 4A and 4B showing a low current H-bridge and a low power H-bridge, according to one embodiment of the present invention.
Figure 28:
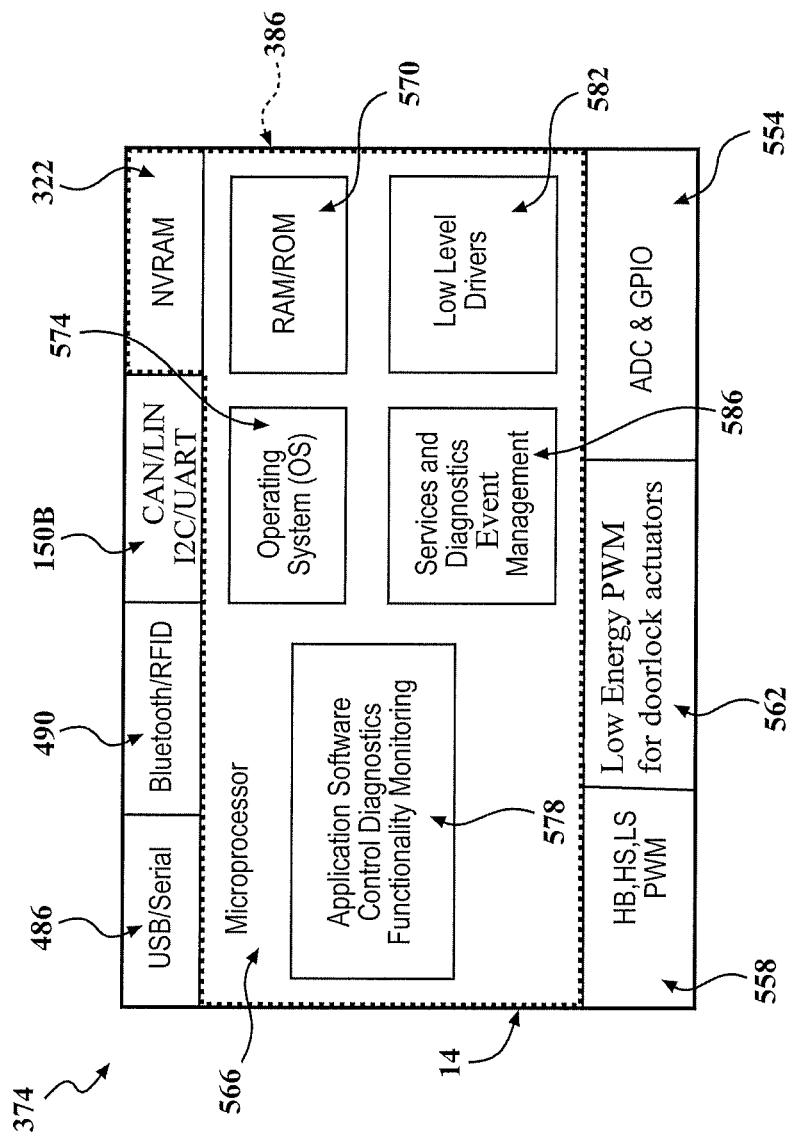
FIG. 28 is a block diagram illustrating control architecture of the central ECU of FIGS. 4A and 4B, according to one embodiment of the present invention.

The central ECU 14 includes a low current H-bridge 410 and low power H-bridge 414 as illustrated in FIG. 27. The low current H-bridge 410 includes integrated field effect transistors (FET) and supports up to four high side power HS7 and low side power LS7 outputs for bi-directional DC motors 106, 106A, 122, 198. Filtered battery power BAT-F is supplied to the low current H-bridge 410. A serial peripheral interface 542 allows for two-way communication between the micro-controller 386 and the low current H-bridge 410. Current monitoring capabilities are included in the low current H-bridge 410 with analog current feedback 546A being transmitted to the micro-controller 386 indicating the current draw of the integrated FETs. The micro-controller 386 generates PWM motor control 318 instructions based in part on one or more of instructions 86A, 86B received through the 12-volt digital input interface 394, instructions 86A, 86B received through the flexible digital input interface 398, memory information stored in the NVRAM 322, the analog current feedback 546A, and/or internal preprogrammed instructions stored in the micro-controller 386. Optionally, the micro-controller 386 can generate the PWM motor control 318 instructions based in part on received feedback 146 from a Hall Effect position sensor 130 if the specific application includes a Hall Effect position sensor 130. In the embodiment shown in FIG. 27, the low current H-bridge 410 high and low side power outputs HS7, LS7 provide power to bi-directional DC motors 198 having a maximum running current draw of about 1.5 amps and configured to provide x-axis and y-axis motion of outer mirrors 66, 66'.

The low power H-bridge 414, shown in FIG. 27, is supplied with filtered battery power BAT-F. The low power H-bridge 414 includes current sensing capabilities and provides an analog current feedback 546A to the micro-controller 386. The micro-controller 386 creates control instructions CS and an enable signal EN based in part on one or more of instructions 86A, 86B received through the 12-volt digital input interface 394, instructions 86A, 86B received through the flexible digital input interface 398, memory information stored in the NVRAM 322, the analog current feedback 546A, and/or internal preprogrammed instructions stored in the micro-controller 386. The micro-controller 386 transmits control instructions CS and an enable signal EN to the low power H-bridge 414. The low power H-bridge 414 includes pairs of high side and low side motor power outputs HS2, LS2. In the embodiment shown in FIG. 27, high side and low side motor power outputs HS2, LS2 are electronically coupled to a low current bi-directional DC motor 106A having a peak current draw of about 3.5 amps to 6 amps.

FIG. 28 illustrates the control architecture 374 of the central ECU 14. The central ECU 14 includes embedded USB/serial interface 486, Bluetooth/RFID interface 490, and CAN/LIN interface 150B. Also included in the CAN/LIN interface 150B is the capability to communicate with an inter-integrated circuit bus (I2C) and a universal asynchronous receiver-transmitter bus (UART). Other embedded module interfaces 486, 490, 150B can be included in the central ECU 14 to support other communications methods. The central ECU 14 can utilize these communication methods as desired for specific applications. An analog-to-digital converter (ADC) and a general-purpose input/output (GPIO) interface 554 are included for handling electrical inputs and electrical outputs of the micro-controller 386. The central ECU 14 provides modularity of communications by integrating various embedded communication interfaces 486, 490, 150B, 554 within the central ECU 14. The specific embedded communication interfaces 486, 490, 150B, 554 included within the central ECU 14 can be adjusted to support various applications. The central ECU 14 provides a portable solution since the central ECU 14 has the flexibility to interface with other devices, including electronic devices 22 associated with automotive power seating applications 30, 54, 58, door assemblies 62, and adjustable outer mirrors 66, as non-limiting examples.

The central ECU 14 includes electronic circuitry 558 to provide high side power HS1-HS7, low side power LS1-LS7, current and power H-bridges (HB) 410, 414, and PWM motor control 318, as shown in FIG. 28. Further, the central ECU 14 includes electronic circuitry 562 to provide low energy PWM motor control 318 for door lock actuators 182. The central ECU 14 presents a flexible architecture 374 for applications where bi-directional DC motor control 106, 106A, 122, 198 is required for functions such as: power seats 30, 54, 58, power outer mirrors 66, adjustable pedals 74, 78, and adjustable steering column 70, as non-limiting examples. The central ECU 14 also includes single power outputs for system applications such as heating systems 110, venting systems 114, uni-directional latches 186, and door lock actuators 182, as non-limiting examples. The central ECU 14 is a centralized system consisting of multiple bi-directional DC motor control interfaces 302 with external position sensor interfaces 402 to monitor the position of selected bi-directional DC motors 106, 106A, 122, 198.

The micro-controller 386 of the central ECU 14 includes a microprocessor 566, as shown in FIG. 28. The microprocessor 566 includes non-volatile random-access memory (NVRAM) 322, random-access memory (RAM) 570, and read only memory (ROM) 570. An operating system (OS) 574, application software 578, and low-level drivers 582 are preloaded into RAM/ROM 570 of the microprocessor 566. Additional application software 578 includes control diagnostics and functionality monitoring. Further, the microprocessor 566 includes software to handle services and diagnostics event management 586. Aging compensation and online calibration for vehicle seat 30, 54, 58 applications can be incorporated into the central ECU 14 since the central ECU 14 includes a number of communication interface options, as well as includes NVRAM 322. The flexibility of including specific communication interfaces 486, 490, 150B, as well as the micro-controller 386 receiving analog current feedback 546A and fault feedback 548 from the multiple MOSFET drivers 406A-406C, current and power H-bridges 410, 414, and dual HSD relays 418, 422, allows the micro-controller 386 to perform functional safety checks and redundancy verification. Further, the micro-controller 386 can store service data in the NVRAM 322 and communicate service data through one or more of the available communication network interfaces 150, 154. As such, the central ECU 14 can be configured to include service data communication readiness for specific applications desiring this feature.

The micro-controller 386 of the central ECU 14 includes preprogrammed instructions in the application software 578 that include a prioritized ranking of the plurality of attached electronic devices 22. The prioritized ranking can categorize specific electronic devices 22 into groups of high priority, medium priority, and low priority, as a non-limiting example. Thus, the micro-controller 386 can sequence created command instructions based on a pre-assigned priority ranking, assuring that certain electronic devices 22 are provided power before other electronic devices 22. For example, the micro-controller 386 can be preprogrammed to create prioritized command instructions for the door lock actuators 182. Further, the micro-controller 386 can selectively delay creating command instructions for the bi-directional DC motors 160E, 106F attached to the outer mirrors 66, 66' until after the micro-controller 386 has created command instructions for high priority electronic devices 22.

In addition to sequencing the creation of command instructions, the micro-controller 386 can be preprogrammed to selectively delay creating command instructions for selected electronic devices 22. For example, the micro-controller 386 can be preprogrammed to selectively restrict the total amount of electronic devices 22 receiving power output during a specific time period in order to restrict the total current draw through the solid-state relays 342, 342'. Similarly, the micro-controller 386 can delay creating command instructions for selected electronic devices 22 until after the micro-controller 386 ceases creating command instructions for other electronic devices 22. In effect, the micro-controller 386 can limit the total amount of current draw through the central ECU 14 by selectively sequencing providing power output among the plurality of electronic devices 22. In essence, the central ECU 14 can avoid providing power output simultaneously to every attached electronic device 22 since the micro-controller 386 can selectively sequence providing power output to individual electronic devices 22.

Further, since the micro-controller 386 receives analog current feedback 546A and fault feedback 548 from the multiple MOSFET drivers 406A-406C, the current and power H-bridges 410, 414, and the dual HSD relays 418, 422, the micro-controller 386 can detect faults that occur in connected electronic devices 22. The analog current feedback 546A and the fault feedback 548 enable the micro-controller 386 to confirm that the attached electronic devices 22 have functioned as expected. Thus, if the micro-controller 386 detects analog current feedback 546A and/or fault feedback 548 that are out of preprogrammed expected ranges, the micro-controller 386 can transmit an error instruction through the CAN interface 154 and/or LIN interface 150. In addition, when the micro-controller 386 detects an error condition, the micro-controller 386 can retain a service flag indicator in the NVRAM 322. Finally, the micro-controller 386 can create alternate command instructions based on the detection of an error condition. For example, if the micro-controller 386 receives an instruction 86A requesting an increase in a temperature setting for a heating system 110 and the micro-controller 386 detects an error condition with the heating system 110, the micro-controller 386 can selectively create a command instruction providing power output to an illumination device 178 in lieu of creating a command instruction requesting the central ECU 14 to provide power output to the heating system 110.

The central ECU 14 is customizable such that the central ECU 14 can be incorporated into a number of different vehicles 18 and/or vehicles 18 with different electronic devices 22 since the central ECU 14 includes multiple MOSFET drivers 406A-406C, current and power H-bridges 410, 414, dual HSD relays 418, 422, and solid-state relays 342, 342'. Individual electrical outputs 42 can be assigned to electronic devices 22 as required for a specific application. For example, if the central ECU 14 is configured to provide eight pairs of high side/low side power outputs HS1, LS1 providing PWM motor control 318, the eight pairs of power outputs HS1, LS1 can be assigned to provide power output to six bi-directional DC motors 106 attached to the driver seat 30 and two bi-directional DC motors 106 attached to the passenger seat 54 in a first vehicle 18. In a second vehicle 18 having a different configuration of driver and passenger seats 30, 54, four pairs of high side/low side power outputs HS1, LS1 can be assigned to provide power output to four bi-directional DC motors 106 attached to the driver seat 30, with the remaining four pairs of power outputs HS1, LS1 being assigned to provide power output to four bi-directional DC motors 106 attached to the passenger seat 54. Thus, by changing the application software 578 stored in memory of the micro-controller 386 and changing the wiring harness 84, the same central ECU 14 can be used for two different vehicle 18 applications.

One benefit of the central ECU 14 is the reduction in the number of power seat modules 202 and/or door modules 206 in a vehicle 18, which also reduces the complexity of the electrical/electronic system architecture 10. A second benefit is the central ECU 14 provides PWM motor control 318 to bi-directional DC motors 106, 106A, 122, 198, which are attached to the driver seat 30, passenger seat 54, and rear seat 58 of the vehicle 18, and optionally attached to the adjustable steering column 70, the adjustable accelerator and brake pedals 74, 78, and adjustable outer mirrors 66, 66'. A third benefit is the central ECU 14 selectively provides power output to one or more seat heating systems 110, seat venting systems 114, door lock actuators 182, solenoids 190, illumination devices 178, and uni-directional latches 186. A fourth benefit is the central ECU 14 includes non-volatile random-access memory (NVRAM) 322, allowing the central ECU 14 to retain memory settings, service data, and diagnostic information. A fifth benefit is the central ECU 14 can prioritize actuation of the connected electronic devices 22 attached to the vehicle seats 30, 54, 58, the steering column 70, accelerator and brake pedals 74, 78, outer mirrors 66, 66', and door locks actuators 182 based on preprogrammed prioritizing criteria. A sixth benefit is the use solid-state components, including solid-state relays 342, 342', that provide analog current feedback 546A and fault feedback 548 to the micro-controller 386 of the central ECU 14, allowing for diagnostics and fault recovery within the micro-controller 386. A seventh benefit is the central ECU 14 can be reconfigured with changes to pre-programmed application software 578 to utilize the central ECU 14 for a variety of vehicle 18 applications since individual electrical inputs 38 and electrical outputs 42 can be reassigned to different electronic devices 22 and electronic sensors 26 within a vehicle 18. An eighth benefit is the central ECU 14 can be reconfigured by populating or depopulating individual electrical inputs 38 and electrical outputs 42 within a common control architecture 374. By using a common control architecture 374, multiple central ECUs 14 can be created for a variety of vehicle 18 applications while saving on manufacturing costs.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A central electronic control unit, said central electronic control unit comprising a micro-controller, said micro-controller configured to receive feedback from a plurality of sensors and configured to receive input instructions for one or more of a plurality of electronic devices, said micro-controller creating one or more command instructions in response to said received input instructions and said received feedback, said central electronic control unit configured to selectively provide power to each of said plurality of electronic devices in response to said one or more command instructions created by said micro-controller;

each of said plurality of electronic devices being designed to perform a specific function, said plurality of electronic devices including a first electronic device attached to a first vehicle seat and a second electronic device attached to a second vehicle seat, each of said first and second vehicle seats comprising a seat cushion and a seat back mounted to said seat cushion, said first vehicle seat being spaced apart from said second vehicle seat; and said plurality of sensors including a first sensor and a second sensor, said first sensor providing feedback on a status said first electronic device, said second sensor providing feedback on a status of said second electronic device;

wherein said first electronic device is a first bi-directional direct current (DC) motor and said first sensor is a first Hall Effect sensor providing feedback on a positional status of said first bi-directional DC motor, and said micro-controller creating a first command instruction in response to one or more of said received input instructions for said first electronic device and said feedback received from said first Hall Effect sensor; and wherein said central electronic control unit configured to provide pulse width modulated (PWM) power to said first bi-directional DC motor based in part on said first command instruction created by said micro-controller.

2. The central electronic control unit as set forth in claim 1, wherein:

said second electronic device is a second bi-directional DC motor, and said second sensor is a second Hall Effect sensor providing feedback on a positional status of said second bi-directional DC motor; and said micro-controller creating a second command instruction in response to one or more of said received input instructions for said second electronic device and said feedback from said second Hall Effect sensor; and said central electronic control unit configured to provide pulse width modulated (PWM) power to said second bi-directional DC motor based in part on said second command instruction created by said micro-controller.

3. The central electronic control unit as set forth in claim 2, wherein:

said plurality of electronic devices including a first seat surface temperature control system attached to said first vehicle seat;

said plurality of sensors including a first thermistor operatively coupled to said first seat surface temperature control system, said first thermistor providing feedback to said micro-controller about a thermal status of said first seat surface temperature control system;

said micro-controller creating a third command instruction in response in part to received instructions for said first seat surface temperature control system and received feedback from said first thermistor; and said central electronic control unit configured to selectively provide power to said first seat surface temperature control system in response to said third command instruction from said micro-controller.

4. The central electronic control unit as set forth in claim 3, wherein:

said plurality of electronic devices including a second seat surface temperature control system attached to said second vehicle seat;

said plurality of sensors including a second thermistor operatively coupled to said second seat surface temperature control system, said second thermistor providing feedback to said micro-controller about a thermal status of said second seat surface temperature control system;

said micro-controller creating a fourth command instruction in response in part to received instructions for said second seat surface temperature control system and received feedback from said second thermistor; and said central electronic control unit configured to selectively provide power to said second seat surface temperature control system in response to said fourth command instruction from said micro-controller.

5. The central electronic control unit as set forth in claim 4, wherein each of said first and second seat surface temperature control systems are configured to heat, cool, and/or ventilate a seat surface of said respective first and second vehicle seats.

6. The central electronic control unit as set forth in claim 5, wherein said central electronic control unit includes non-volatile random-access memory (NVRAM);

said central electronic control unit retains at least one memory setting in said NVRAM for one or more of said plurality of electronic devices;

said micro-controller configured to receive a memory selection instruction;

said micro-controller creating one or more memory command instructions based in part on said micro-controller receiving said memory selection instruction; and said central electronic control unit configured to selectively provide power to said one or more of said plurality of electronic devices in response to said one or more memory command instructions from said micro-controller.

7. The central electronic control unit as set forth in claim 6, wherein said central electronic control unit operatively controls adjustment speed of one or more of said first and second bi-directional DC motors.

8. The central electronic control unit as set forth in claim 7, said central electronic control unit comprising a Metal Oxide Semiconductor Field Effect Transistor (MOSFET) driver and a first solid-state relay, said MOSFET driver operatively coupled to said micro-controller, said MOSFET driver operatively coupled to said first solid-state relay, and said first solid-state relay operatively coupled to a first one of said plurality of electronic devices; wherein:

one or more command instructions created by said micro-controller are distributed to said MOSFET driver;

said MOSFET driver creating a first relay command instruction in response to said one or more command instructions received from said micro-controller, said first relay command instruction being distributed to said first solid-state relay; and said first solid-state relay providing high side power to said first one of said plurality of electronic devices in response to said first relay command instruction.

9. The central electronic control unit as set forth in claim 8, wherein in one or more of said command instructions created by said micro-controller distributed to said MOSFET driver includes at least a power width modulation (PWM) command instruction.

10. The central electronic control unit as set forth in claim 9, said central electronic control unit comprising a second solid-state relay, said MOSFET driver operatively coupled to said second solid-state relay, and said second solid-state relay operatively coupled to said first one of said plurality of electronic devices; wherein:

said MOSFET driver creating a second relay command instruction in response to said one or more command instructions received from said micro-controller, said second relay command instruction being distributed to said second solid-state relay; and said second solid-state relay providing low side power to said first one of said plurality of electronic devices in response to said second relay command instruction.

11. The central electronic control unit as set forth in claim 10, said MOSFET driver providing current draw feedback to said micro-controller about an amount of current drawn through one or more of said first and second solid-state relays.

12. The central electronic control unit as set forth in claim 11, said MOSFET driver creating fault feedback and providing said fault feedback to said micro-controller.

13. The central electronic control unit as set forth in claim 12, wherein said central electronic control unit is configured to receive and/or transmit data through one or more of a universal asynchronous receiver-transmitter (UART), inter-integrated circuit (I2C), a local interconnect network (LIN), a controller area network (CAN), a universal serial bus (USB), a serial bus, Bluetooth, radio-frequency identification (RFID), and/or a vehicle wide communication network.

14. The central electronic control unit as set forth in claim 13, wherein said central electronic control unit includes a general-purpose input/output interface (GPIO) and/or an analog-to-digital converter (ADC).

15. The central electronic control unit as set forth in claim 14, wherein said central electronic control unit includes one or more single power outputs, each of said single power outputs configured to selectively provide power to one or more of a seat heating system, a venting system, a unidirectional latch, a solenoid, a mirror defroster, an illuminated indicator, and/or an actuator.

16. The central electronic control unit as set forth in claim 15, wherein said plurality of electronic devices includes a third electronic device attached to a first vehicle component system, said first vehicle component system spaced apart from said first vehicle seat and spaced apart from said second vehicle seat;

said micro-controller creating command instructions in response in part to received instructions for said third electronic device; and said central electronic control unit configured to selectively provide power to said third electronic device in response to said command instructions from said micro-controller.

17. The central electronic control unit as set forth in claim 16, wherein said first vehicle component system includes one or more of a steering column, a power mirror, an accelerator pedal, a brake pedal, and/or a door assembly.

18. The central electronic control unit as set forth in claim 17, wherein said micro-controller receives input instructions for two or more of said plurality of electronic devices;

said micro-controller prioritizing said input instructions based in part on a preprogrammed prioritized ranking of said two or more of said plurality of electronic devices;

said micro-controller creating prioritized command instructions based in part on said prioritized input instructions; and said central electronic control unit providing power to said two or more of said plurality of electronic devices in response to said prioritized command instructions.

19. The central electronic control unit as set forth in claim 18, wherein said micro-controller sequences said prioritized command instructions and said central electronic control unit sequences providing power to said two or more of said plurality of electronic devices in response to said sequenced prioritized command instructions.

20. The central electronic control unit as set forth in claim 17, wherein:

said microprocessor creating a first memory command instruction and a second memory command instruction based in part on said microprocessor receiving said memory selection instruction;

said central electronic control unit providing power to said first electronic device based in part on said first memory command instruction from said micro-controller; and said central electronic control unit providing power to said third electronic device based in part on said second memory command instruction from said micro-controller.

21. The central electronic control unit as set forth in claim 17, wherein:

said micro-controller receiving fault feedback and analog current feedback from said MOSFET driver; and said micro-controller detecting a fault condition associated with one of said plurality of electronic devices based in part of said received fault feedback and/or said current draw feedback from said MOSFET driver.

22. The central electronic control unit as set forth in claim 21, wherein said micro-controller stores one or more of service data and/or said detected fault condition in said NVRAM.

* * * * *